US010762132B2

(12) United States Patent
Perlegos et al.

(10) Patent No.: US 10,762,132 B2
(45) Date of Patent: Sep. 1, 2020

(54) SYSTEM FOR REFERRING TO AND/OR EMBEDDING POSTS, VIDEOS OR DIGITAL MEDIA WITHIN ANOTHER POST, VIDEO, DIGITAL DATA OR DIGITAL MEDIA WITHIN 2D, 3D, 360 DEGREE OR SPHERICAL APPLICATIONS WHEREBY TO REACH CONVERGENCE OR GROUPING

(71) Applicant: Pixured, Inc., Zephyr Cove, NV (US)

(72) Inventors: Nick John Perlegos, Zephyr Cove, NV (US); Jangwon Lee, Santa Clara, CA (US)

(73) Assignee: Pixured, Inc., Zephyr Cove, NV (US)

( * ) Notice: Subject to any disclaimer, the term of this patent is extended or adjusted under 35 U.S.C. 154(b) by 794 days.

(21) Appl. No.: 15/231,012

(22) Filed: Aug. 8, 2016

(65) Prior Publication Data

US 2017/0123614 A1    May 4, 2017

Related U.S. Application Data

(60) Provisional application No. 62/285,471, filed on Oct. 29, 2015.

(51) Int. Cl.
*G06F 16/74*    (2019.01)
*H04N 21/858*   (2011.01)
(Continued)

(52) U.S. Cl.
CPC ............ *G06F 16/748* (2019.01); *G06F 16/70* (2019.01); *G06F 16/75* (2019.01); *G06F 16/78* (2019.01);
(Continued)

(58) Field of Classification Search
CPC ........ G06F 16/70; G06F 16/748; G06F 16/75; G06F 16/78; G06F 16/787; G06F 50/01; H04N 21/858
See application file for complete search history.

(56) References Cited

U.S. PATENT DOCUMENTS

2002/0076674 A1* 6/2002 Kaplan ................. G06Q 10/10
                                                                  434/107
2009/0204907 A1* 8/2009 Finn ..................... G06Q 30/02
                                                                  715/757

(Continued)

OTHER PUBLICATIONS

Perez, "Twitter is Experimenting with a New Way to Retweet," Jun. 24, 2014, https://techcrunch.com/2014/06/24/twitter-is-experimenting-with-a-new-way-to-retweet/.*

(Continued)

*Primary Examiner* — Ryan Barrett
(74) *Attorney, Agent, or Firm* — Wood, Phillips, Katz, Clark & Mortimer

(57) ABSTRACT

There is disclosed herein a system of managing posts for interacting with web based digital video. The system comprises a user interface application operating on one or more user devices which are operative to view web based digital video, the user interface application creating posts that refer to digital media items, digital media items comprising images, video, 3d images, 3d video, 360-degree images, 360-degree video, geocoded images, geocoded video or spherical digital images and spherical digital video. A database system stores user created posts. The created posts are clustered or grouped to reach convergence. A programmed processing system is in operative communication with user devices and the database system for creating and managing embedded data in user created posts and one or more select locations in select web based digital video, wherein users interacting with the user interface application can access user created posts.

30 Claims, 18 Drawing Sheets

(51) Int. Cl.

| | | |
|---|---|---|
| *G06Q 50/00* | (2012.01) | |
| *G06F 16/70* | (2019.01) | |
| *G06F 16/75* | (2019.01) | |
| *G06F 16/78* | (2019.01) | |
| *G06F 16/787* | (2019.01) | |
| *H04N 21/2187* | (2011.01) | |
| *H04N 21/81* | (2011.01) | |
| *H04N 21/4788* | (2011.01) | |
| *H04N 13/111* | (2018.01) | |
| *H04N 21/258* | (2011.01) | |
| *H04N 13/183* | (2018.01) | |
| *H04L 12/18* | (2006.01) | |
| *H04L 12/58* | (2006.01) | |
| *H04N 13/156* | (2018.01) | |
| *H04N 13/117* | (2018.01) | |

(52) U.S. Cl.
CPC ........... *G06F 16/787* (2019.01); *G06Q 50/01* (2013.01); *H04L 12/1845* (2013.01); *H04L 51/046* (2013.01); *H04L 51/20* (2013.01); *H04N 13/111* (2018.05); *H04N 13/117* (2018.05); *H04N 13/156* (2018.05); *H04N 13/183* (2018.05); *H04N 21/2187* (2013.01); *H04N 21/25891* (2013.01); *H04N 21/4788* (2013.01); *H04N 21/812* (2013.01); *H04N 21/816* (2013.01); *H04N 21/858* (2013.01); *H04L 51/10* (2013.01)

(56) References Cited

U.S. PATENT DOCUMENTS

| | | | | |
|---|---|---|---|---|
| 2010/0046842 | A1* | 2/2010 | Conwell | G06K 9/228 382/218 |
| 2010/0048242 | A1* | 2/2010 | Rhoads | G06K 9/6253 455/556.1 |
| 2010/0197318 | A1* | 8/2010 | Petersen | H04W 4/029 455/456.1 |
| 2011/0041080 | A1* | 2/2011 | Fleischman | G06Q 30/02 715/751 |
| 2011/0161875 | A1* | 6/2011 | Kankainen | G06F 3/0481 715/810 |
| 2012/0075341 | A1* | 3/2012 | Sandberg | G06F 3/147 345/633 |
| 2012/0206647 | A1* | 8/2012 | Allsbrook | H04N 21/434 348/461 |
| 2012/0296739 | A1* | 11/2012 | Cassidy | G06Q 30/02 705/14.51 |
| 2013/0004138 | A1* | 1/2013 | Kilar | H04N 21/4756 386/230 |
| 2013/0046771 | A1* | 2/2013 | Moitra | G06Q 30/0201 707/749 |
| 2014/0067825 | A1* | 3/2014 | Oztaskent | H04N 21/4782 707/748 |
| 2014/0115441 | A1* | 4/2014 | Badoiu | G11B 27/105 715/230 |
| 2014/0179424 | A1* | 6/2014 | Perry | A63F 13/355 463/31 |
| 2014/0204119 | A1* | 7/2014 | Malamud | G06T 19/006 345/633 |
| 2015/0242525 | A1* | 8/2015 | Perlegos | G06F 16/972 707/782 |
| 2015/0289022 | A1* | 10/2015 | Gross | H04N 21/4725 725/51 |
| 2015/0339303 | A1* | 11/2015 | Perlegos | G06F 16/9558 707/756 |
| 2016/0080820 | A1* | 3/2016 | Lee | H04L 51/32 725/34 |
| 2017/0034112 | A1* | 2/2017 | Perlegos | H04L 51/32 |
| 2017/0109585 | A1* | 4/2017 | Matias | G06K 9/00751 |

OTHER PUBLICATIONS

Billings et al., "Permanently Desiring the Temporary? Snapchat, Social Media, and the Shifting Motivations of Sports Fans," Jun. 28, 2015, https://journals.sagepub.com/doi/10.1177/2167479515588760.*

Morris et al., "Learning Trajectory Patterns by Clustering: Experimental Studies and Comparative Evaluation," Jun. 20-25, 2009, https://ieeexplore.ieee.org/document/5206559.*

Buzan et al., "Extraction and Clustering of Motion Trajectories in Video," Aug. 26, 2004, https://ieeexplore.ieee.org/document/1334287.*

Fradet et al., "Clustering Point Trajectories with Various Life-Spans," Nov. 12-13, 2009, https://dl.acm.org/citation.cfm?id=1747805.*

Kalayeh et al., "Understanding Trajectory Behavior: A Motion Pattern Approach," Jan. 4, 2015, https://arxiv.org/abs/1501.00614.*

Lee et al., "Trajectory Clustering: A Partition-and-Group Framework," Jan. 2007, https://www.researchgate.net/publication/32964752_Trajectory_Clustering_A_Partition-and-Group_Framework.*

Nanni et al., "Time-focused density-based clustering of trajectories of moving objects," Nov. 2006, https://www.researchgate.net/publication/220616315_Time-Focused_Clustering_of_Trajectories_of_Moving_Objects.*

Ossama et al., "An extended k-means technique for clustering moving objects," Mar. 2011, https://www.researchgate.net/publication/241111263_An_extended_k-means_technique_for_clustering_moving_objects.*

Zeppelzauer et al., "A Novel Trajectory Clustering Approach for Motion Segmentation," Jan. 2010, https://www.researchgate.net/publication/305397574_A_novel_trajectory_clustering_approach_for_motion_segmentation.*

* cited by examiner

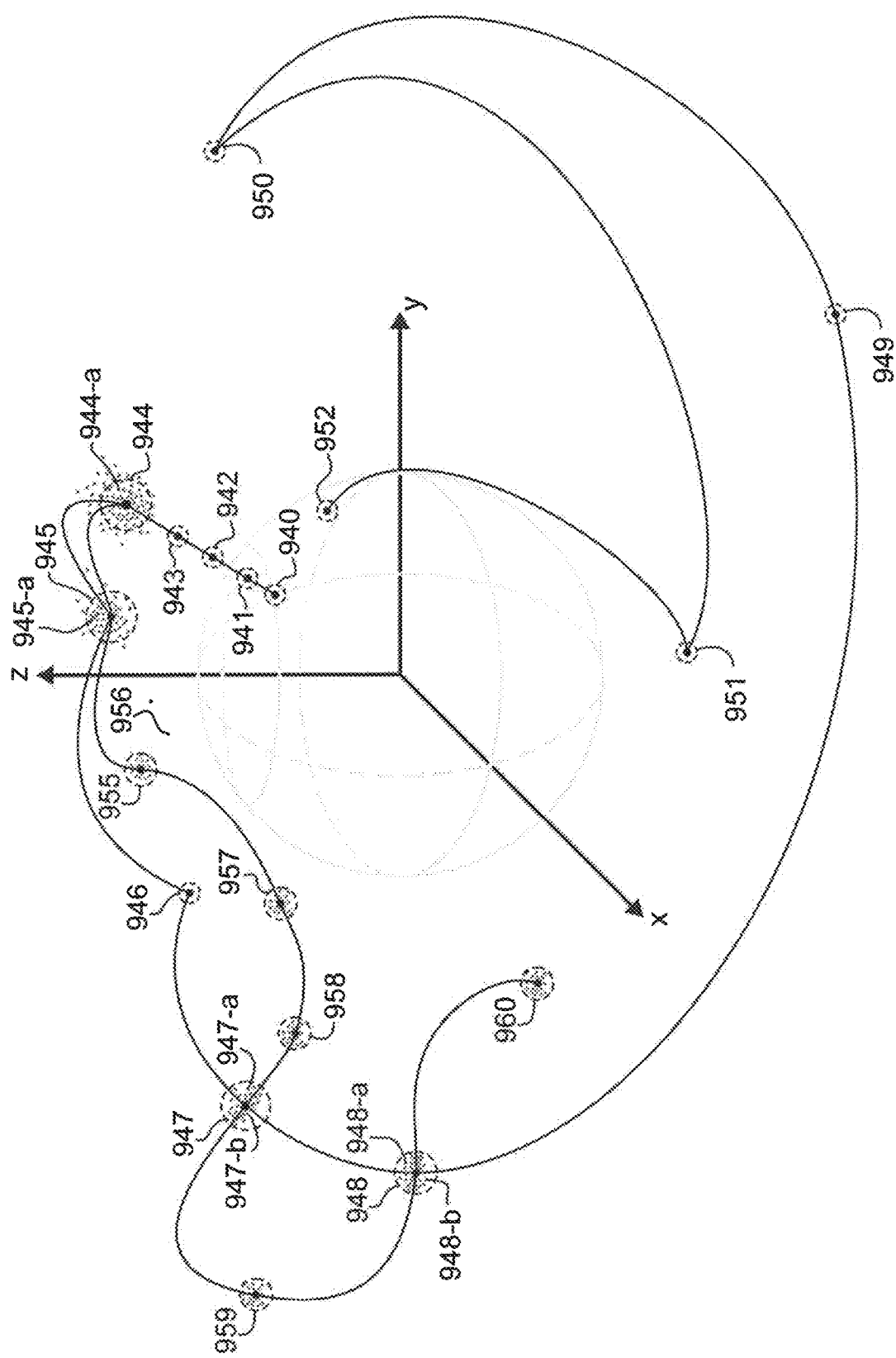

SYSTEM FOR REFERRING TO AND/OR EMBEDDING POSTS, VIDEOS OR DIGITAL MEDIA WITHIN ANOTHER POST, VIDEO, DIGITAL DATA OR DIGITAL MEDIA WITHIN 2D, 3D, 360 DEGREE OR SPHERICAL APPLICATIONS WHEREBY TO REACH CONVERGENCE OR GROUPING

BACKGROUND OF THE INVENTION

The present inventions relates to a system for embedding the manipulation or addition of information, digital media and/or data relating to posts, videos, digital media and video spaced in a 3D or spherical environment. Users interacting with the disclosed system will be able to identify (locate), refer and/or embed information, digital media, and/or data (using the system or various APIs). People engage, discover, watch and share originally-created videos. The system provides a forum for people to connect, inform, and inspire others across the globe and acts as a distribution platform for original content creators and advertisers large and small. With the greater social impact from various technologies, devices, software and influencers any person who chooses to share on the internet at anticipated and unanticipated levels. Creating trendy videos or post to go viral and to be seen around the world by millions and even billions of people in the matter minutes or days. New platforms must be created to support the growing demand of information and data. Advertising within these platforms continues to grow as better more effective methods allow none intrusive and native ways for these platforms to grow.

The disclosed system allows for users to find meaningful information, photos or videos can be taken and shared from anywhere with information traveling faster and becoming more reliable. Users who take photos or videos with the said invention embark on a very unique experience, taking what a photo says or amazing videos whereby the meaning, the feelings, the experience of the past (the photo or video), and redefining how the photo associates with users supporting and producing additional meaning/value to users. Media makes it simpler for users to express themselves while sharing towards new means of communication. The disclosed system also makes use of videos, sound, links, objects, locations, proximity whereby embedding to posts or tags.

While there are many applications where the present invention could be implemented, this method would be used to create a platform that users and business can use while also providing additional resources that allow developers and advertisers to expand the use and implement development tools into their own technologies.

SUMMARY OF THE INVENTION

The system relates to computer implemented software and methods whereby embedding the manipulation or addition of information to digital media, posts and video, comprising of a method relating to a database system storing a plurality of digital media items each having associated data relating to features of the digital media item. The system can also make use of a social graph of users, posts, posts of other posts, objects, video and digital media.

The scope of the invention and disclosure is embedding and/or referencing posts within digital media where disclosure primarily refers to video. The disclosed invention may relate to connecting people within their lives and businesses with their customers, while enabling faster and easier communication between people, advertisers, developers and businesses. Where video may relate while not limiting to an electronic medium relating to the recording, storing, copying and/or broadcasting of moving visual images. The system may be referred to as a platform that embed posts within other posts, content (like images, news articles, links, videos, sounds, etc.) within other content, creating a dynamic search and social experience. A simple platform for anyone to use, connecting everything and anything, from people to businesses, places to things, traveling to food; showing the top trending to searched information. The system may also offer advertisements that are useful, relevant and natural without impacting user experience. Referrals will run alongside booking and product sales. Subscription will embody various levels of services that support business and services provided by business to people. In some embodiments services are defined as socially driven by users and data. The disclosed invention may include or be considered a network and platform that simplifies data by capturing relationships that are extremely complicated thru an easy to use interface where users can engage at any level of the social experience. For example the system enables users to create a post (posts comprise of text and/or content like photos, videos, links, audio, etc.) or posts another users post (post comprise of text and/or content like photos, videos, links, audio, etc.), or simply share the posts with followers and networks. The methods include implementing and/or create a dynamic search for objects, images, and words, while also establishing a strong community where users can contribute by embedding posts within posts, posts within any part of another post and content within content.

The invention uses implementations to converge points that relate to posts and objects within digital media and real time augmented virtual reality.

BRIEF DESCRIPTION OF THE DRAWINGS

Any references with the following drawings as well as additional embodiments thereof, with like references numerical refer to corresponding parts of figures.

FIG. 9C illustrates a convergence of spherical coordinates within digital media or augmented reality from a vantage point view a point change position with change in time.

DETAILED DESCRIPTION OF THE INVENTION

Figure 1:
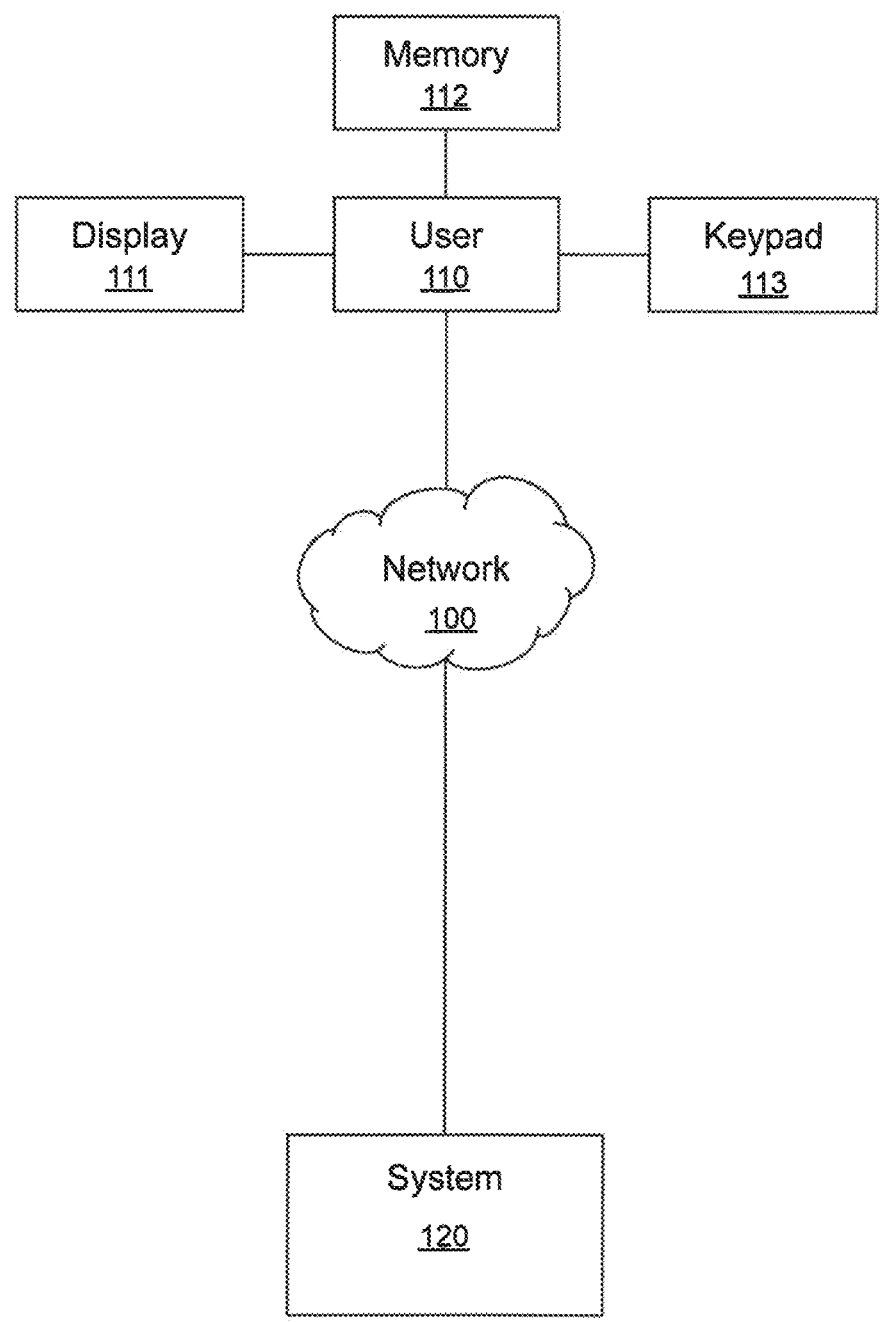
FIG. 1 illustrates a method for showing digital data to users and communication through networks.

The embodiments disclosed below is/are not intended to be exhaustive or limit the invention to the precise form disclosed in the following detailed description. Rather, the embodiment is chosen and described so that others skilled in the art may utilize its teachings.

This application describes a method for a system clustering or the convergence of points from embedded or referencing digital media or posts within any part of another digital media or post and/or combination of. The method in some embodiments are used with two-dimensional or three-dimensional applications whereby the set of points are static or dynamic.

Exemplary embodiment for one static point or more than one static points may be limited by being fixed or two-dimensional fixed. Alternatively other embodiments may include one dynamic point or more than one (or sets of) dynamic points that may change position, change coordinates or move. Dynamic points may embody a two-dimensional or three dimensional space.

In abstract terms and convenience the description of the invention defines content as one or more and or combination of digital media (photos, albums, video, live video, spherical video and spherical photos), documents, objects, sound, live video (broadcast) while not limiting other mediums like magazines, tabloids, news or books.

The method comprises of users where the method adds ease, convenience, and enhanced results (or relationships) to mobile devices, PC's, websites, social networks, third party platforms and databases. In some embodiments features that may be included are call, linking, messages, social networks, sharing, search and location. The method also helps find objects or queries faster and in context. The method may further include deals or advertisement that users may take advantage of.

The system in some embodiments include methods that may also include calculating a rating, price, relationship and/or answer to a request with or without data and/or information from a social entity and/or objects. Additionally product, services, application, solution, digital media, data, and/or data may in some embodiments relate to traits/categories, proximity, habits, Insight, ideal prospects, attributes, behaviors, topic, interest, keywords, remarketing, education, work place, origin, location targeting, demographics, adaptive profiling, participation, feeds, trends, postings, photos, blogs, topics, stories, advertisements, comments, current ratings, ownership, values are determined from the identified and/or selected points of one more users, groups, data and/or digital media. In some embodiments include timing components. The system and said method may implement distribution (Gaussian, logistic, lognormal, Weibull), likelihood functions, Bayesian inference and/or timing (decay) to calculating and/or determine a rating, machine learning, price and/or answer based on multiple variables aided by social ranking. In some embodiments a combinations of and multi-deviations of implemented distribution (Gaussian, logistic, lognormal, Weibull), likelihood functions, Bayesian inference and/or timing. Other algorithms also include Birch, k-mean or similar. In some embodiments the system may also use SVM (support vector machine) that include various learning models and/or algorithms that analyze data and recognize patterns that are commonly used for regression analysis or other analysis. Other examples include approaches like node wise similarities analysis, pattern based approaches additionally the value and/or generated distributions or values (together with) variations and width including providing simplified objects or values. In some embodiments include using calculated and/or mathematical techniques to analyze and/or display variables, digital media, data and information. Social networks provide a number of ways to analyze social ranking whereby the said method enlists code to perform operations and analysis while also data relating to values, ranking and scores. The system may include embodiments that calculate the probability that a user or where the user would like and/or relate to and may be within one or more standard deviation and/or deviations (may comprise to include a mean) which may include products, services, applications, solutions, digital media, data, digital media data and/or data.

The system that includes search is not limited to photos or videos or any user input and past interaction with the disclosed invention could be used in search query through a communication network to locate and present the most accurate information to users on their user devices.

If available location services of an area, this could be a static or a live location of an area, features may connect with many other popular features like internet based maps to provide mapping of the area. Users may be presented with deals, offers, advertisements, and additional information. These features may also be extended through the communication network to the user devices, with the addition of other applications and platforms. Users may edit, copy, share, communicate, or change one or more items made available to the said user. In some embodiments, the effects on the network and collected data, may be defined as a user profile to show the changes and updates. Additionally updating data throughout our network for viable data based regarding large amounts of data, values and weights; efficiency throughout our network, where distant social connection may take longer to update than adjacent social connections or nearby social web connections, including advertisements and deals friends help friends (or followers help followers) receives deal and/or save. Business may offer features that can provide and link to the storefront page, or any other ecommerce site that business are associated with. User, businesses and entities may provide objects to sell while also searching a database of items the business sells, while also showing items that are localized and are sold by a particular seller, providing a link or location where users may find out more or buy products. For example a company advertises a product, if it is something a user can buy, a user can link a user to somewhere, it can be bought, whether or not being on a social network site, online retailer, or any other storefront whereby being made available. If it is a place the system can find out how to get there, while also viewing data and other information that would be associated with digital media. Using an example of a restaurant, a user may be connected through other social platforms that offer reservations, rating and reviews, information, order, ability to takeout, while also finding more information and also providing addition services that enhance users. From restaurants users will be able to view menu's or food, various posts of food served, storing information and provide rating for those seeking the information (query) who are within your network and/or who are not within your network whereby third parties can embed within othering their own services. With food users can search for restaurants that serve food that looks appealing, while also showing images posted that are listed with greater value within a user network and presenting any relevant information not in a user network. Features in the said invention may be presented to users surfing the web, using applications or viewing digital media where there is no social connections.

In any of the figures or language relating to the system or method or geography, or variations of design do not limit the said invention. Points that make up a region can also be referred to as points. Users will be able to favorite associated points in digital media and photos while also allowing users to share these favorites. Users will be able to comment on associated points and keep favorites privately or socially. The said invention allows users to manipulate photos, adding various filters or making adjustments to contrast, brightness, saturations, hue, etc. in some embodiments users are connected with the ability to associate points digital media of another user. With the said inventions users will be able create profiles that may be searchable with other platforms.

Generally relating to video (from capturing, recording, processing, storing, and transmitting a sequence of still images representing scenes in motion additionally with sound effects and dialogue recorded) may be broken down into components. One or more components of still images and/or sound (various processes sound wave).

Hashtags could also be added to photos, videos or posts that contain photos, said hashtag would allow people to pick up trending digital media in social web, throughout the web and communication network. Hashtags could be added automatically from the recognized areas while also having a list of preset hashtags that the user could select (these posts could be created automatically from the points).

Embodiments may include equations, algorithms, logic and software, the said invention could also license and/or use additional technology, equation, algorithms, and software. The said invention would in some embodiments automatically or have one or more users manually input data for associations or allocations whereby reaching a convergence of points. Identifications made automatically of one or more association from digital media or search queries are performed within a server system that has one or more processors and memory storage. The server system can be broken up and processes data with a plurality of processor and memory while also running in the foreground or background. The disclosed server system can receive and make the associations automatically and identify while also providing data available to a user.

On a user device some embodiments may include buttons or features that may link the viewing users with additional photos, data, digital media of a particular user, users, business, place, object, or relating and or ranked data and content; for example user selects an identification of a another user where one or more features are made available, here user can select a feature to view photos associated with user. When relating to other application a user could be searching for an article of clothing, where from the digital media for a user taken photo or viewing a web page, a user features may include "where to buy" the article of clothing, photos of the article of clothing that have been taken, or from an online store a photo could do more than just showing the user a picture. Containing photos or videos could also be organized by association, for example if a user adds a certain association to the said users favorites list, then any photo with that same association has an importance to a user. That may create a more automated feed and more in the context search results.

Tags, retags, posts of another post and posts are treated the same of the disclosed system but in the front-end whereby dealing with user interface. In some embodiment as used herein, the system includes objects or entities generally refer to one or more local business or place, company, organization or institution, brand, product artist, professional & public figure, entertainment cause & community. The system also includes local businesses and places that may defined by, categorized by and/or relate to one or more (or combination of) but not limited to airport, arts, attractions, automotive, bank, bar, book store, business services, church, club, community, concert venue, doctor, education, entertainment, event planning & services, financial services, food, government, grocery, health, medicine & pharmacy, hospital clinic, hotels, landmarks, lawyer, library, movie theater, museum & art gallery, nightlife, outdoor & sporting goods, pet services, professional services, public places, real estate, religious organization, restaurants, schools, shopping & retail, spas, beauty & personal care, sport venue, sports, recreation & activities, things to do, tours & sightseeing, transportation, university, and other relating to local business or place. a company, organization or institution may further comprise of, defined by, categorized by and/or relate to one or more (or combination of) but not limited to aerospace & defense, automobiles & parts, bank & financial institution, biotechnology, cause, chemicals, church & religious groups, community organization, computer hardware, computers & technology, consulting & business services, energy & utility, engineering & construction, farming & agriculture, fashion and beauty, food & beverages, foundation, government organization, health, medical & pharmaceuticals, industrial, insurance, internet, software, legal & law, manufacturing, media, news & publishing, mining & materials, non-government organization, non-profit organization, political organization, political party, professional services, religious organization, retail & consumer merchandise, small business, telecommunication, transport & freight, travel & leisure, university and other relating to a company, organization or institution. The system may also incorporate a brand or product may further comprise of, defined by, categorized by and/or relate to one or more (or combination of) but not limited to antiques & collection, apparel & accessories, appliances, arts & entertainment, auto, baby & kids, bags, building materials, business & industrial, camera & photo, commercial equipment, computers and hardware, education, electronics, fashion and beauty, financial services, food & beverages, furniture, games & toys, gifts & occasions, health & beauty, home décor, household supplies, jewelry & watches, kitchen & cooking, luggage, media, music, office supplies, outdoor & sporting goods, patio & garden, pet supplies and services, phone & table, product & services, public figure, software, tools & equipment, travel, video games, vitamins & supplements, website, wine & sprites and other relating to a brand or product. The system may also incorporate artist, professional & public figure may further comprise of, defined by, categorized by and/or relate to one or more (or combination of) but not limited to an actor, artist, athlete, author, business person, chef, coach, comedian, dancer, entertainer, fictional character, government official, journalist, monarch, movie character, musician & band, news personality, pet, politician, politician, producer, public figure, teacher, writer and other relating to an artist, professional & public figure, entertainment may further comprise of, defined by, categorized by and/or relate to one or more (or combination of) but not limited to book series, book store, concert, tour, concert venue, fictional character, library, magazine, movie, movie character, movie theater, music award, music chart, music video, professional sports team, radio station, record label, school sports team, song, studio, TV show and other relating to entertainment. the system may also incorporate a cause or community may further comprise of, defined by, categorized by and/or relate to one or more (or combination of) but not limited to animals, charitable, education, environment, foundation, health, human services, international, public benefit, religion and other relating to a cause or community.

The system may also incorporate or can also be embodied with subscriptions, purchases etc. current systems or systems with advancements in technology allow and enable users to access and share information throughout the web and through mobile devices through various types of networks.

In most cases and from what is currently available, social networks allow for one or more users through a structure of organized data, to interact with one another whereby organizing and enabling individuals, groups and entities to be connected throughout one or more networks integrated into a software platform that can connect with other third-party application.

With various connections and interactions a social network (when applicable) can collect data within the system and through other third-party systems. This data can be organized in a social graph whereby the data can be collected, organized to relate whereby serving better results to one or more users of the system and third party systems.

In some embodiments the system may graph illustrates relationships used within the system the includes one or more users, entities, objects, posts, posts of another post, viewed content, locations, proximity, and virtually anything shared with the system and other third-party systems. Anything within the system can be represented by a webpage whereby linking any information while also enabling the user interface in a social environment. Some parts of the system may react to data in real-time component or ticks.

The system also includes the ability for video compression or various format compression techniques or a video compression specification is a specification for digitally representing a video as a file or a bit stream. Examples of video compression formats include MPEG-2 Part 2, MPEG-4 Part 2, H.264 (MPEG-4 Part 10), HEVC, Theora, Dirac, ReaMdeo RV40, VP8, VP9 and VP10. In some embodiments an MPD or HLS (or similar) is created to stream video of varying quality based on bandwidth. Examples of a video codec is Xvid, which implements encoding and decoding videos using the MPEG-4 Part 2 video compression format in software. A video encoded according to a video compression format is normally bundled with an audio stream (encoded using an audio compression format) inside a multimedia container.

The system also includes and managed media or video formats such as AVI, MP4, FLV, RealMedia, HLS, MGPEG-DASH, mpd, VP9, 3D Video, spherical video, augmented reality video, WEBRTC, or Matroska. Multimedia container formats can contain any one of a number of different video compression formats; for example the MP4 container format can contain video in either the MPEG-2 Part 2 or the H.264 video compression format, among others. Another example is the initial specification for the file type WebM, which specified the container format (Matroska), but also exactly which video (VP8) and audio (Vorbis) compression format is used inside the Matroska container, even though the Matroska container format itself is capable of containing other video compression formats (VP9 video and Opus audio support was later added to the WebM specification). Other sizes and resolutions include 4K, 8K, 2K, 1080i, 1080p, 2160p, 24p, 4320p 480i, 480p, 576i, 576p, 720i, 720p, CCIR System A, A-MAC, CCIR Isystem B, B-MAC, C-MAC, D-MAC, D2-MAC, DVB-T, Effio, CCIR System G, CCIR System H, High frame rate, CCIR System I, IFrame (video format), Interlaced video, IRE (unit), Joint Level Interface Protocol, CCIR System M, MovieCD, Moving image formats, Naraloop, NTSC, NTSC-C, PAL, PAL region, PAL-M, PALplus, SECAM, SMPTE 292M, Sound-in-Syncs, Ultra high definition television, VF bandwidth, Video, or other Video compression format.

In some embodiments, a user may be presented with one or more results that connect or relates with one or more past interactions with the system. Additionally the results may also include one or more results that may include one or more and/or combination of users, posts, digital media, answers to relating search, proximity, objects and/or advertisements. Whereby shown to the user in one or combination of lists, grids, image views, or cards. The user may be presented with one or more buttons or symbols resulting in the desired results. One or more servers and technologies however not limiting to may include web, http/https, FTP, application, GCI, ASP, HTML, XML, java, JSON, JavaScript, C, objective C, async, Java, AJAX, PHP, Python, ruby, and similar. Other data collected would include electronic belongings comprising of software and hardware device. The disclosed system may track posts that are linked to one or more objects or users. An affinity may be determined between one or more users, objects, posts and entities. In some embodiments a post may be performed on any part of a user's profile, purchase, travel, etc, whereby in some embodiments rewarding users for reviewing a product, or stay at a hotel, dining, or service, travel flight, etc. whereby these rewards may be redeemable or used toward real world items, stays, purchase, services, of gifting one or more points. Posts may also interact with a user's experience on a game or animation. Endorsement of products, restaurants, travel (etc.) to other users, friends, followers, followees, relationships and networks may offer more significance allowing data to be measured and offer a better advertisement than a regular advertisement without metrics. Post are not limited to the type of or items embedded referred, referenced to or any attachments like digital media, text, objects, metadata, (etc.) Any post to the system may be linked to analytics showing performance to include both natural and paid. Backlinks for posts may include one or more posts refer to other posts.

In some embodiments a computer network includes various levels of servers and databases. The user device and the front-end processing server interact through the communication network. Data is sent from the user through the users device to the front-end processing server, which then the data is allocated to one or more parallel servers for processing. Each parallel server could have one specific query search process or multiple designated query search process or random query search process (i.e. remote hosted undedicated servers). In some embodiment, the servers could be broken up to specific tasks of each component. The parallel search systems individually process the data query; if and when the data is processed the information is sent to the front-end server system. Sometimes the front-end server could process one or more query on the search. The results sent back from the Parallel query server system could include any format data (i.e. textual documents, images, video, etc.) The front-end server updates processed information thought the communication network to the user device. In some embodiments, the processed data could be stored through the corresponding server databases, front-end database while also storing information on the user device. In some embodiments, parallel servers can interact directly with each other. The query could result in being a text that is found within the data. For example a digital image of writing or a phone number could be processed to determine an association. The server system as a whole will send at least one processed data back to the user. There is no limit on the number of parallel servers within the server system of. In some embodiments the server system could contain a content engine where data is processed and collected between one or more users, associations within digital media, interests, traits, preferences to aid in creating links, relationships and similarities.

Additionally the said invention in some embodiments will use, outsource, best practice, create, license, technology that will enable users through a plethora of technology like CDN, databases, indexes, object stack, cloud, API, SDK, middleware, SQL to serve content to end-users for text, graphics, URLs and scripts, media files, software, documents, applications, e-commerce, portals live streaming media, on-demand streaming media, and social networks. Furthermore some technology may extend to crawling, indexing, and sorting operations while also utilizing available space storage, whereby information and data may be stored on one or more storage systems.

The operating system for each device (i.e. IOS, ANDRIOID, WINDOWS MOBILE, DARWIN, LINUX, UNIX, OS X, WINDOWS, VxWorks, etc.) the software components and/or drivers that controlled and manage general system responsibilities (i.e., memory, memory management, storage device control, power management, etc.) and while also enabling interactions among various hardware and software components. The user device while also including solid state drives, non-volatile memory, magnetic disk drive, optical disk storage, flash memory.

A post may contain content whereby both the post and/or content may contain and/or share one or more image(s), video(s), audio, document(s), link(s), subscription(s), application(s), third-party application(s) and/or provider advertisement(s). In some embodiments from the post or content of the post a user can create one or more post with no content and with content. For example a post can contain content like an image (or images), video (or videos), audio (or audios), document/file (or documents/files), link (or links), subscription (or subscriptions) or an application can use any content and manipulate the content whereby defining a class for all users to view whereby the system recognizes as a dynamic content. Through an API and with some set restricts to keep data uniform and without error developers and providers may allow users to create post with Apps within the set systems user interface or through other providers or applications that interact with the system. Additionally any post created can have one or more other post created from (as a result from) or originating from the post or content.

An example when a user searches the system that can query one or more posts, content, and users while also including any entities, objects, links, and places to find information relating to a user, post, content or collections of user, posts, content from and/or may contain one or more posts, content, posts of another post, data, digital media, advertisements, while also embodying one or more or any combination images, videos, audio, documents, advertisements, links, subscriptions, applications, third-party publications, or provider advertisement. The user is presented with the through various interfaces whether in a browser or on mobile devices, whereby on different devices search and information relating to a user's, posts, contents or collections of users, collections of posts, collections of content and may also contain one or more posts, content, posts of another post, data, digital media, advertisements.

Simply how the system handles a large number of posts with or without content where any number of posts created from the post or from any part of the post or content. Post containing content whereby one or more post can be created from the content and then more posts can be created from the new posts content. For example post with image, whereby another post is created with video from the post. Similarly post with video(s) created from a post, additionally post with an app or web can create one or more posts with or without content. Additionally many posts can be created and progress whereby the system keeps posts organized and content managed. Additionally content can be created from the post and act similarly to when posts are created from content. For example posts with content like video or images can have one or more post created from the post or the content of any post. In some embodiments depending on the user interface and backend systems. In other embodiments the front end user interface may operate with restrictions different from backend systems, keeping the back end flexible to incorporate various third-party platforms.

When a user searches for and how a system can relate relations between items. Posts, content, posts of another post, data, digital media, advertisements whereby including any images, video, audio, documents, links, subscriptions, applications, third-party applications, provider advertisements managed by the system to produce related, relevant, searched and/or source content, data and other information to one or more users or other systems, whereby any post, content or anything embodied within a post can refer and relate to other post and data within the system. For example the system dealing with any number of posts while also involving other posts like posts, content, post of another post, data, digital media, advertisements whereby including any images, video, audio, documents, links, subscriptions, applications, third-party applications, provider advertisements—managed by the system to produce related, relevant, searched and/or source content, data and other information to one or more users or other systems.

The system can address posts, posts of other posts (posts referencing the parent posts) post with a series of posts and posts of another post from a plethora of users. Relationships between user's interactions aid the system in determining relevance and ranking within a system any interaction within the system. In one embodiment, a post from $user_1$ whereby the post is referred by one or more of the same user and other users. $User_1$ refers the post by adding in one embodiment images. Other users post by adding text and images. Any of the said post can have any number posts and posts of another post coupled to any post and to the original post. The same user can also post the same post multiple times, for example users referenced the post made by $user_1$. In one embodiment the post made by $user_3$ of the post from $user_1$ can have one or more posts by any number of users and/or the same user. Additionally, posts of posts from another post may have any number of posts and posts of other posts. For example a posts of posts of another post having one or more posts of another post and another post having one or more posts coupled to that post.

In some examples a post may comprise of one or more image, video, and/or link/web content while also pointing to one or more objects and text. Objects are things in the world that may not be represented by a user. In some embodiments objects could be a city or state, government, holiday etc. An object may be available through an API for or more clients, developers, third-parties whereby defining objects within the system as objects within the system. In addition to having a post comprise of various text, objects and content of a post can also include metadata, rich text, subsets, and data whereby a post is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the post. Users may further define and allocate addition relationships, data and information by referencing posts coupled to posts. Additionally posts that contain and no digital media (or content) can also point to posts. Shares in some embodiments can also refer post and any data, digital media, content, information, while also including similar embodiments. In one embodiment a system interacting with one or more user through a network can focus on a post that may comprise of one or more image, video, and/or link/web content while also pointing to one or more objects and text. In addition to having a posts comprise of various texts, objects and content posts can also include metadata, rich text, subsets, and data. Whereby a post is not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate, favorite on comment whereby adding to the post. Users may further define and allocate additional relationships, data and information by posting coupled posts. In one embodiment a system interacting with one or more users through a network may focus on a post may comprise of one or more links while also pointing to and including one or more objects and text. Posts may also just be a representation, re-share or a copy of the coupled post. In addition to having a posts and posts coupled to other posts comprise of various text, objects and content a post can also include metadata, rich text, subsets, and data. Whereby a post are referring to and not limited to also including and/or created by digital media, content, links, hyperlinks, meta data, meta elements (metatags), objects, apps, articles, documents, scores, ranking, API, data, backlinks and/or information. Users interacting with the said system can have the opportunity to rate or favorite and comment whereby adding to the post. Users may further define and allocate additional relationships, data and information by posting and posts coupled to posts. Additionally, posts that contain no digital media (or content) can also point to posts. Shares in some embodiments can also refer posts refers to other posts and any data, digital media, content, information, while also including similar embodiments.

In some embodiments where users can create original posts, add posts with content to posts and text to posts. For example, $user_a$ creates $post_a$ that contains one or more and/or combination of documents, photos, videos, sounds, graphics, augmented representation, links, events, articles, objects, and apps while also containing one, a plurality and/or combination of data, metadata, metatags (meta element), EXIF data, keyword, hastags, comments, favorite (like), text, links, location, entities, objects, entries, places, and users. Followed by a user creating a post where a $user_a$ or $user_n$ creates posts, that contains one or more and/or combination of documents, photos, videos, sounds, graphics, augmented representation, links, events, articles objects, and can contain data, metadata, metatags (meta element), EXIF data, keyword, hastags, comments, favorite (like), text, links, location, entities, objects, entries, places, and users are embedded within or refers to the post, of users. If a user creates a posts with just text from the $post_a$ created by user will not allow other users to add content to the post, where in some embodiments from $post_{aa}$ (with content like digital media), $user_a$ or $user_n$ creates, embeds or shares $post_{aaa}$ that contains one or more and/or combination of data, metadata, metatags, EXIF data, keyword posts, hastags, comments, favorite (like), text, links, location, entities, objects, entries, places, and users are embedded within or refers to $post_{aa}$.

Embodiment of a user adding content (and/or digital media and data) to any or any part of digital media. In some embodiments adding content (and/or digital media and data) to any or any part of digital media may also include a region or set of points within digital media. Corresponding points can relate to a photo, document, video (for each frame or group of frames), and audio.

In some embodiments $user_a$ creates post, that contains one or more and/or combination of documents, photos, videos, sounds, graphics, augmented representation, links, events, articles, objects, apps while also containing one, a plurality and/or combination of data, metadata, metatags (meta element), EXIF data, keyword posts, hastags, comments, favorite (like), text, links, location, entities, objects, entries, places, and users. Additionally $user_a$ or $user_n$ creates post, that contains one or more and/or combination of documents, photos, videos, sounds, graphics, augmented representation, links, events, articles and can contain data, metadata, metatags (meta element), EXIF data, keyword posts, hastags, comments, favorite (like), text, links, location, entities, objects, entries, places, and users are embedded within or refers to the post, of $user_a$. Furthermore $user_a$ or $user_n$ creates, embeds or shares $post_{aaa}$ that contains one or more and/or combination data, metadata, metatags, EXIF data, keyword posts, hastags, comments, favorite (like), text, links, location, entities, objects, entries, places, and users are embedded within or refers to $post_{aa}$.

From user $user_a$ or $user_n$ creates $post_{aa}$ that contains one or more and/or combination of documents, photos, videos, sounds, graphics, augmented representation, links, events, articles and can contain data, metadata, metatags (meta element), EXIF data, keyword posts, hastags, comments, favorite (like), text, links, location, entities, objects, entries, places, and users are embedded within or refers to the $post_a$ of $user_a$ in some embodiments $user_a$, $user_n$ or $User_{n1}$ creates $post_{ab}$ that contains one or more and/or combination of documents, photos, videos, sounds, graphics, augmented representation, links, events, articles, apps while also containing one, a plurality and/or combination of data, metadata, metatags (meta element), EXIF data, keyword posts, hastags, comments, favorite (like), text, links, location, entities, objects, entries, places, and users are embedded within or refers to a documents, photos, videos, sounds, graphics, augmented representation, links, events, articles, apps from any part of $post_{aa}$. $user_a$, $user_n$, or $user_{n1}$ creates embeds and/or shares $post_{aba}$ that contains one or more and/or combination data, metadata, metatags, EXIF data, keyword posts, hastags, comments, favorite (like), text, links, location, entities, objects, entries, places, and users are embedded within or refers to $post_{ab}$.

To continue creating posts from digital media and/or parts of digital media, $user_a$, $user_n$, $user_{n1}$ or $user_{n2}$ creates $post_{ac}$ that contains one or more and/or combination of documents, photos, videos, sounds, graphics, augmented representation, links, events, articles, apps while also containing one, a plurality and/or combination of data, metadata, metatags (meta element), EXIF data, keyword posts, hastags, comments, favorite (like), text, links, location, entities, objects, entries, places, and users are embedded within or refers to a documents, photos, videos, sounds, graphics, augmented representation, links, events, articles, apps from any part of $post_{ab}$. Furthermore $user_a$, $user_n$, $user_{n1}$ or $user_{n2}$ creates, embeds and/or shares $post_{ac}$ that contains one or more and/or combination data, metadata, metatags, EXIF data, keyword posts, hastags, comments, favorite (like), text, links, location, entities, objects, entries, places, and users are embedded within or refers to $post_{ac}$.

In some embodiments a user can create posts aided by the disclosed invention. A $user_1$ creates $post_1$ with digital media or content, and may include other data metadata and text and/or $post_1$ is created by an API. From the created $post_1$ with digital media or content, $user_1$, or another $user_n$, creates $post_{1a}$ with digital media or content. Posts that have been created from another post can be shared with no text or shared with text. Post that have been created with text and digital media or content from another post can share the post created with text. In some embodiments $user_1$ or another $user_n$ shares $post_{1a}$ with no text (or $user_n$ creates $post_{1ab}$ shared with no text) or $user_1$ or another $user_n$ creates $post_{1aa}$ with text. $Post_{1ab}$ shared with no text and $post_{1aa}$ with text originate from $post_{1a}$ with digital media. $User_1$ or another $user_n$ shares $post_{1aa}$ with no text. Shares that refer to a previous post can be place within be placed and/or pushed to one or more user, followers, networks, third-party networks, contacts, and/or personal contacts (through messaging, text messaging, email, cross platform, instant messaging or subscription).

$User_1$ or $user_2$ creates $post_{1b}$ with digital media embedded or referring to any or any part of digital media (or content) of $post_1$. From $user_1$ or $user_2$ creates $post_{1b}$ with digital media embedded or referring to any or any part of digital media (or content) of $post_1$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1bb}$ shared with no text) or $user_1$ or another $user_n$ creates $post_{1ba}$ with text. $Post_{1ba}$ shared with no text and $post_{1ba}$ with text originating from $post_{1b}$ with digital media. $User_1$ or another $user_n$ shares $post_{1ba}$ with no text. Shares that refer to a previous post can be placed within and pushed to one or more user, followers, networks, third-party networks, contacts, and/or personal contacts (through messaging, text messaging, email, cross platform, instant messaging, socket messaging or subscription).

$User_n$ creates $post_{1n}$ with digital media embedded or referring to any or any part of digital media (or content) of $post_{1b}$. From $user_n$ creates $post_{1n}$ with digital media embedded or referring to any or any part of digital media (or content) of $post_{1b}$. Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). $User_1$ or another $user_n$ shares $post_{1b}$ with no text (or $user_n$ creates $post_{1nb}$ shared with no text) or $user_1$ or another $user_n$ creates $post_{1na}$ with text. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within be placed and/or pushed to one or more users, followers, networks, third-party networks, contacts, and/or personal contacts (through messaging, text messaging, email, cross platform, instant messaging, socket messaging or subscription).

Posts that have been created from any part of another post (or any part of another post may include digital media and/or content) can be shared with no text or shared with text. Post that have been created with text and digital media or content from another post can share the post created with text. Additionally a user can create a post with content or digital media from posts that have been created from any part of another post (or any part of another post may include digital media and/or content). This method in some embodiment can continuously or indefinitely occur. From these posts created from any part of another post may include digital media and/or content) can be shared with no text or shared with text, in some embodiments can be indefinite and continuously performed as mentioned in the method and illustrations of and the disclosed invention.

In some embodiments one or more posts may be referred to or embedded in one or more other post or part of other posts. For example a post created with two images can have one post referring to or embedded within the first image and three posts referring to or embedded within the second image, while also not limiting any other information or data relating and post created as a result of a user creating a post from an originating post.

In some embodiments the defined by the functionality of the system and user interface, a user can create $post_1$ with digital media where the same ($user_1$) or another $user_n$ creates $post_{1a}$ with digital media. $Post_{1a}$ refers to or embedded in posts whereby one or more additional information and data may be stored for either $post_1$ or $post_{1a}$ while also containing but not limited to other information like text, metadata (or meta elements), metatags, links, strings, (or $post_{1a}$ created by meta elements).

From the created $post_1$ with digital media or content, $user_1$ or another $user_n$ creates $post_{1a}$ with digital media or content. Posts that have been created from another post can be shared with no text or shared with text. Post that have been created with text and digital media or content from another post can share the post created with text. In some embodiments users or another $user_n$ shares $post_{1a}$ with no text (or $user_n$ creates $post_{1ab}$ shared with no text) or users or another $user_n$ creates $post_{1aa}$ with text. $Post_{1ab}$ shared with no text and $post_{1aa}$ with text originate from $post_{1aa}$ with digital media. From the share of $post_{1a}$ or the created $post_{1aa}$, are either embedded or referred to $post_{1a}$. Additionally in some embodiments $user_1$ or another $user_n$ shares $post_{1aa}$ with no text which is refer to $post_{1aa}$. Shares that refer to a previous post can be place within be placed and/or pushed to one or more user, followers, networks, third-party networks, contacts, and/or personal contacts (through messaging, text messaging, email, cross platform, instant messaging, socket message or subscription).

$User_1$ or $user_2$ creates $post_{1b}$ with digital media embedded or referring to any or any part of digital media (or content) of $post_1$. From the new $post_{1b}$ refers or embedded in (and/or data is embedded in $post_1$ or $post_{1b}$) to the $post_1$ with digital media and/or content. From $user_1$ or $user_2$ creating $post_{1b}$ with digital media embedded or referring to any or any part of digital media (or content) of $post_1$, $user_1$ or another $user_n$ shares $post_{1b}$ with no text (or $user_n$ creates $post_{1bb}$ shared with no text) or $user_1$ or another $user_n$ creates $post_{1ba}$ with text whereby both $post_{1ba}$ and shared post with no text refer to or are embedded within the created $post_{1b}$. $Post_{1ba}$ shared with no text and $post_{1ba}$ with text from $post_{1b}$ with digital media. $User_1$ or another $user_n$ shares $post_{1ba}$ with no text. Shares that refer to a previous post can be place within be placed and/or pushed to one or more user, followers, networks, third-party networks, contacts, and/or personal contacts (through messaging, text messaging, email, cross platform, instant messaging, socket message or subscription). A post created by a post of any part of content wherein some embodiments the originating post could be part of another referenced and/or embedded.

$User_n$ creates $post_{1n}$ with digital media embedded or referring to any or any part of digital media (or content) of $post_{1b}$. From the new $post_{1b}$ refers or embedded in (and/or data is embedded in $post_{1b}$ or $post_{1n}$) to the $post_1$ with digital media and/or content. From $user_n$ creating $post_{1n}$ with digital media embedded or referring to any or any part of digital media (or content) of $post_{1b}$, $user_1$ or another $user_n$ shares $post_{1b}$ with no text (or $user_n$ creates $post_{1bb}$ shared with no text) or $user_1$ or another $user_n$ creates $post_{1nb}$ with text whereby both $post_{1na}$ and shared post with no text refer to or are embedded within the created $post_{1n}$. $Post_{1nb}$ shared with no text and $post_{1na}$ with text originate from $post_{1n}$ with digital media. $User_1$ or another $user_n$ shares $post_{1na}$ with no text. Shares that refer to a previous post can be place within and/or pushed to one or more user, followers, networks, third-party networks, contacts, and/or personal contacts (through messaging, text messaging, email, cross platform, instant messaging, socket message or subscription).

In some embodiments a user can create posts, creates posts referring to or embedded in any or any part of a digital media or content within a post, posts created from other posts (with or without content) and sharing any post aided by the disclosed invention. In some embodiments $user_1$ creates $post_1$ with digital media where the same $user_1$ or one or more $user_n$ can create a post from the whole $post_1$, any digital media (or content) and/or any part of digital media (or content) contained in $post_1$, posts with text and/or shares $post_1$ to one or more networks, followers of the creating user who post and/or share. Where in some embodiment the user same, $user_1$ or one or more $user_n$ can create a post from the whole $post_1$, any digital media (or content) and/or any part of digital media (or content) contained in $post_1$, post with text and/or shares $post_{1a}$ to one or more networks, followers of the creating user who post and/or share. If a post is created with text, that same post with text can be shared to one or more networks, followers of the creating user who post and/or share. For example $user_1$ or another $user_n$ shares $post_{1aa}$ with no text.

Additionally some embodiment include the same user, $user_1$ or one or more $user_n$ creates $post_{1n}$ as a result from any digital media (or content) and/or any part of digital media (or content) contained in $post_1$, and a post created with text from $post_{1n}$ and/or shares $post_{1n}$ to one or more networks, followers of the creating user who post and/or share. If a post is created with text that same post with text can be shared to one or more networks, followers of the creating user who post and/or share. For example user or another $user_n$ shares $post_{1na}$ with no text.

In addition some embodiment included the same user, $user_1$ or one or more $user_n$ creates a post with text from $post_1$ and/or shares $post_1$ to one or more networks, followers of the creating user who post and/or share. If a post is created with text for example $post_{1aa}$ with text can be shared to one or more networks, followers of the user who created the share. For example $user_1$ or another $user_n$ shares $post_{1aa}$ with no text.

In some cases and in some embodiments, a post and/or share can refer to and/or may embed within one or more users other posts, digital media, content, links, hyperlinks, meta data, meta elements, objects, apps, articles, documents, scores, ranking, API, data, backlinks and/or information. For example a post can refer to the posting $user_1$. Any user that creates a $post_{1a}$ from a post include the same user who created the original post may have $post_{1a}$ and/or any digital media, content, links, hyperlinks, meta data, meta elements, objects, apps, articles, documents, scores, ranking, API, data, backlinks and/or information refer to or embedded in either $post_{1a}$ or $post_1$. Furthermore embodiment may also include post with text, shares of post with text and shares of posts refer to and/or embedded within one or more other posts. For example, $user_1$ or another $user_n$ shares $post_{1a}$ or $user_1$ or another $user_n$ creates $post_{1aa}$ with text where $post_{1aa}$ or share of $post_{1a}$ can refer to or embedded in $post_{1aa}$, the share of $post_{1a}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1aa}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

Furthermore some examples from any user that creating a $post_{1aa}$ or sharing from any part $post_1$ and/or any part of any digital media or content include the same user who created the original $post_1$ may have $post_{1n}$ and/or any digital media, content, links, hyperlinks, meta data, meta elements, objects, apps, articles, documents, scores, ranking, API, data, backlinks and/or information refer to or embedded in either $post_{1aa}$ share of $post_1$ or $post_1$. Furthermore embodiment may also include post with text, shares of post with text and shares of posts refer to and/or embedded within one or more other posts. For example, $user_1$ or another $user_n$ shares $post_1$ or $user_1$ or another $user_n$ creates $post_{1na}$ with text where $post_{1na}$ or share of $post_1$ can refer to or embedded in $post_1$, the share of $post_{1n}$ and/or $post_{1aa}$ with in some cases anything relating to post, any digital media, content, links, hyperlinks, meta data, meta elements, objects, apps, articles, documents, scores, ranking, API, data, backlinks and/or information. Additionally $user_1$ or another $user_n$ shares $post_{1aa}$. User that view the shared $post_{1aa}$ of $user_1$ or another $user_n$ can be referred to $post_{1na}$ created $user_1$ or another $user_n$ whereby also including in some cases anything relating to post, any digital media, content, links, hyperlinks, meta data, meta elements, objects, apps, articles, documents, scores, ranking, API, data, backlinks and/or information.

In some embodiments the user will be given optional suggestions to the identity of the association while also providing the ability to search, add an identity while also selecting additional associations. When selecting one or more points, the user may associate points that correspond with one or more associations. Points or indicators may vary in size shape color representation while also being interchangeable with buttons and buttons with features. The corresponding association could be one or more people, places, landmarks, buildings, businesses, restaurants, objects, figures, advertisements, etc., the bounding region shows association that is manually and/or automatic recognized within digital media. In some embodiments the bounding region could be understood as just a point that could include a vicinity area surrounding. Additional method for automatic recognizing one or more associations within digital media that could take place at any time. The bounding region shows association automatic recognized and explained within digital media. For example one way one or more server systems analyze bounded points within digital media. The digital media, associations, and/or bounding points are converted into digital data that will be made available for the user. This digital media may include one or more buttons or buttons with features. The corresponding association could be one or more people, places, landmarks, buildings, businesses, restaurants, objects, figures, advertisements, etc., in some embodiments the bounding region could be understood as just a point that could include a vicinity area surrounding. One or more points can be interchangeable with buttons and buttons with features, including identifiers and features that enable users to find out more, call, message, share, getting information, directions, saving for later, adding to favorites, advertisements, settings etc., while also showing a button with features of various identifiers to a corresponding association. In some embodiments the user will be given optional suggestions to the identity of the association, while also providing the ability to search, remove identities, setting tabs, while also adding an identity while also selecting additional associations. Implementing the remove identity would remove all digital data leaving the digital media unaltered; while the user implements remove identity feature which could may or may not remove the data throughout the server system and databases. The user may organize additional information and configurations.

A selection of frames from a video. In some embodiments the video is stored in a file server and given an ID and/or reference. Further describing the embodiment a video or similar digital media may show all the frames contained in the video or frames (parts of frames) in various sequences ordered/sorted or unordered/unsorted. However in most cases a video may be defined as a series of photos in order with a time sequence presented to a user in order to show the contents of the video. For example a video sequence of a vehicle at time n from start to end. In most cases a user uploads the video where the system may give the upload an ID and reference location while also creating a post for the same user or other users to add additional content like descriptions, posts and posts of other posts, comments, favorites etc., while also allowing for one or more reference to and from the post or the uploaded image. Reference may be to a link, a photo, object, post, posts of other posts place, entity, subscription, user, app or other allowed by the system, platform partners, clients etc. Additionally other posts (posts of other posts and another post) can be created from the original post or uploaded video. Whereby referencing the same video (digital media) post, or attributes of, while also adding additional digital media (or objects) and any attributes like descriptions, comments, EXIF data, sequenced, sequence reference, etc. Simply a user created another post from the referenced original post or part of the referenced original post. In some embodiments the new post may contain a time sequence and location of the position of the post. A real life example is illustrated in where a user creates a post with digital media like a video and/or just digital media the same or another user can create a post within any part of the digital media. In some embodiments the post is created referring the frame sequence and/or location (position) of the desired object. For example something referenced within part of a video with a sequence of 5 seconds through 25 seconds and the corresponding position.

A method of how a user using a touch screen can identify the location and the sequenced frames. In some embodiments a user enabling and referenced an object in a video, using a mouse, gestures, or touching (enabled by the device whether it will be a touchscreen device or other devices that we require external devices or sensors to define a referenced region. As the video passes through each frame the user defines the location of the post for the allocated frame. In some embodiments depending on the function, user interface and user interactions the use may or may not be required to keep touching a screen, keeping a mouse enabled, not looking away or other methods not restricting a user from defining a region and/or frame sequence or series of frame sequences. For example the system may limit or not limit the ability for a user to define any or any part of the video or electronic medium. Additionally a simple illustrations of a use maneuvering and using the user interface on an allocated device starts the post at seconds and ends the post at 25 seconds, in this example the user continues to the post for every frame (where in some embodiments the user using a touch screen does not lift his or her (users) finger off the screen) where the user defined one post through the interval. In other embodiment the user may just have to follow an object and defining posts with eye movements or voice commands. Other implementations may include the aid of additional systems, software or third-party providers that aid the user in tracking or identifying objects to post. Other embodiments may include referenced an objects may result in a creation of a post where the user can define the region in separate intervals at different or the same time. For example a user interface with some practical implantation would allocate a user to define a region where from the defined region the user can create one or more post to be created into the defined system.

The object with a post in a video. The user interface and how the post are presented in videos may vary depending on technology, methods and user preference and in no instance this disclosure may prohibit or limit a user posting. A simple representation of the method used to post within or any part of video (sequence of image that make up a video). Illustrating two dimensionally how a post moves across the x and/or y direction while also in some embodiments a timing component. Not limited by the preferred technology or actual method of storing the location within the video and the frame position. The position is represented in some embodiments as actual coordinates of pixels or taking the ratio position of the x in the x direction and the ratio of the y in the y direction. Another component may be added for time or the corresponding frame sequence within the ordered series of frames the make up a video. For example using the method of taking the ratio in the x direction or the ratio in the y direction, first we must calculate the points relative the screen size, image size, video size, side used in the application or system while also including orientation. Taking the ratio if the position in the x direction is 384 (pixels from the left side of the screen) and the total number of pixels in the x direction is we can simply divide 384 getting the results of 0.3 (for the x direction). Performing the same process for the Y direction, Taking the ratio if the position in the y direction is 266 (pixels from the left side of the screen) and the total number of pixels in the y direction is 720 we can simply divide 266 and 720 getting the results of 0.37 (for the y direction). By using proportion, and storing in integers or floats the system may operate with multiple platforms and user device while also allowing for one or more third-party providers to also have the same flexibility. Adding a timing component to the system to indicate the correction frame number or relative time to the video and the corresponding position or positions that the user has selected. For example from the position at the user started with (0.2, 0.5) at 15 sec and at 22 sec the user had moved to position (0.3, 0.37), where every position in between (0.2, 0.5) and (0.3, 0.37) is stored with the corresponding timing component.

Where for every position and frame we can store the values for post_field and frame sequence. Additionally the method of storing can change to be implemented in other technologies and methods. The example above illustrates a representation of using mongoDB but can also be modified to be stored in MySQL or PostgreSQL, therefore not limiting the function of storing the positions and sequence to refer or embedded digital media, posts to any other post, video or digital media.

In some embodiments the posts may be stored 3 dimensionally where the user can define a 2-dimensional or 3-dimensional post to create a post. In other embodiments a use and remove certain polygon shapes from within another polygon. For example post (0.2, 0.5) at 15 seconds, (0.3, 0.37) at 22 seconds, (0.5, 0.82) at 32 seconds, (0.875, 0.15) at 50 seconds or one or more posts, videos or digital media can be referred to and/or embedded within a video. Depending on the user Interface and device anything embedded and/or reference in a video can be shown to the user and/or represented in a multitude of techniques or ways. Other examples would include (0.2, 0.5) at 15 seconds, (0.3, 0.37) at 22 seconds, (0.5, 0.82) at 32 seconds, (0.875, 0.15) at 50 seconds, (0.06, 0.92) at 5 seconds, (0.5, 0.15) at 30 seconds, (0.33, 0.75) at 25 seconds, (0.91, 0.93) at 34 seconds, (0.60, 0.15) at 55 seconds and (0.1, 0.225) for 32 seconds. The system does not limit by or from post or object posts to be made up of various types of posts. For example an object that is a post, can be classified into various types. In some embodiments the system may be classified as an image post, link post, text post, video post, app post, article post, document post, etc., where in some embodiments further contain tables for other classification or system documents like image, video, file, document, application or third-party classification, etc. The system may also limit or properly maintain a schema or structure of the system for referenced (or posting) or embedding posts, posts of other posts and/or digital media (and digital data) within digital media. Other embodiment may include an image post requiring at least one image or a video. All of which is to maintain a scene of structure within the system. Additionally how the system incorporates data fields is defined as relating technologies, platforms or design schema. For example in some embodiments, data for a video can be stored for the position $(x_n, y_n)$, x is the content (for pixels or ratio) in the X direction and in the Y is the content (for pixels or ratio) in the y direction, n is the corresponding set i.e.: n=1, n=2, n=3 etc. A third field classified as time $z_t$ or $t_n$ can be in the same data set i.e.: post_field=listfield for float $(x_n, y_n, t_n)$ or with separate field i.e.: post_field=listfield for float $(x_n, y_n)$ and post_field_time=listfield for $(t_n)$. As the technology progresses the system in some embodiment will incorporate Spherical Coordinates. Spherical Coordinates would include any of the following parameters, calculated component or originating from $x_n$, $y_n$, $z_n$, $r_n$, $\theta$-hat, r-hat or $\phi$-hat and a component for time $t_n$. From the points the system can address many points by allocating the convergence of points or grouping.

A user in embodiments may view one or more posts within digital media like video, motion pictures, and clips. For example from a user device video shows an embodiment of a desert safari, posted within the system or embedded from a third-party provider. Embodiments allow for points that contain one or more posts and data. For example from the user device video clip with one or more points of a post, associated and/or identified. The system can perform defining/identifying points automatically or by a user, (by users as show) which by defining the location within the video and another variable like frame rate or frame number to define the region for various parts of the video or clip.

A user in embodiments may view a posts within digital media like video, motion pictures, and clips from another video. For example from a user device video shows an embodiment of a desert safari, posted within the system or embedded from a third-party provider. In some embodiments by selecting region, the original video is reduced in size and brought to the lower right corner and the new video within a region. Embodiments may also allow for other forms of digital media to be embedded into video like photos and links that may include embedding other videos. Embodiments allow for points that contain one or more posts and data. For example from the user device video clip may have one or more points, posts, associated and/or identified. The system can perform defining/identifying points automatically or by users.

A user in some embodiments can define a region within a video, for example a user using a simple gesture like placing a finger on the user device that is touch sensitive, can identify and follow an object as the video plays, from this user created input the system can recognize the point and or points and frames of video (start and end) including any positions defined on the user device. Defining the region would not be limited to gesture and may also work the same way with a mouse, clicker, eye tracking, and/or stylus. Using multiple fingers may increase and decrease size of the region and/or zoom. Other user implemented features may also include if a user takes their finger off the screen the play of the video stops or just the defined region or both or a dialogue window may ask if the user is done or something else. The region within the region identified by the user is bound by and may also be defined by points.

One or more embodiments whereby relating to proximity or location. A location can be found anywhere in the world, where in one example a post with coupled one or more posts where the post was made. In some embodiments, a post has content that relates to a location or an embodiment like an image where the images was taken near close to or nearby other posts. Location illustrates posts and posts of other posts, where in some embodiments shows that posts and posts of other posts include one or more dimensions for ranking and scoring whereby posts that are closer to the couple or other posts may be ranked lower or higher based on other objects or, posts and posts of other posts. Example of various dimensions would include number of posts, posts of other posts content, allocation, links, other objects, proximity, time of day etc. Location illustrates a post where in some embodiments user has multiple posts coupled to a post of a user or same user. The post and other posts show a higher significance to users feeds and search resulting from the posts that are within various proximity to the coupled post. Other dimensions are also incorporated in the affinity of the posts and other post and everything relating to. Location illustrates how a post can have one or more user's post where each user can post the other post multiple times. Proximity of post and posts of other posts may be given a value for other users to be served within the system.

One or more interaction by a user with a system may be displayed in a feed for one or more users searching and/or following that user. The system can also build data profiles for every user with or without an account whereby scoring and ranking every interaction with the system.

For example posts can have a location where posts of other posts and post that do not share or have_id referring to or embedded within any field can be indexed and related to users or other posts. Additionally within a region or location a post can have nearby posts whereby posts in some embodiments may or may not have the post parent_id in any field. In other embodiments where a region is defined within in some cases referred to as posts or posts of other posts and other cases referred to as posts and posts of other posts. For example post can have a $t_1r_2$ (post's post) from post, another post with another post and another posts with a posts all in the same region or within proximity.

Additionally embodiments may also include posts from various users all may or may not include content like images or video whereby examples are shown within region for corresponding posts and posts of other post.

A spherical coordinates with a change in vantage point or origin relative to definition of change of the origin from to origin of the spherical outliers defines any number of points for the given radius. In some embodiments some points may intersect with the same radius with different origins.

Spherical coordinates within digital media or augmented reality with different vantage points or origin. In some emblements simulate various examples from similar situations. In some emblements be real-time augmented reality or a prerecorded video or virtual combination of image or videos where the user can navigate. For any example the user can get a viewpoint from two separate vantage points or origins. Looking at different points from the origin and points from the origin. Spherical coordinates within digital media or augmented reality with different vantage points or origin and referencing the same point. In some embodiments, more than one user or the same user can see the same point from two different origins or vantage points.

In one embodiment a user could select points of a review a story or more images about a variation of a product from a manufacture. Embodiment that includes posts the point to brand/manufacture where the same brand/manufacture has a $product_1$ that the post also points to. Additionally, posts relate post of $product_{2A}$ of the brand/manufacture. In the same embodiment posts of other posts can point to variations as a whole and posts and posts of other posts can point to one or more products for example like post pointing to $product_{1B}$ and $product_{2C}$. Also posts may be used to help with inventory in stores or confirm inventory of one or more products where users or even employees of the store can report and confirm with one or more user looking for a certain product. For example, images, links, videos, text, shared, documents, other content and data that a system can recognize while also not limited by or through an API, apps, EXIF data, metadata, meta elements, meta tags, and/or objects. Additionally post can be created from any part of another post, for example from digital media (videos, images, audio), links, files, and documents. Posts can also refer to products, brands, manufactures, and variations. One or more posts can be coupled together additionally posts are coupled to posts and other post.

A user querying the system for results. The user may be presented with one or more images, links, data, objects, users, events, news, locations, proximity, suggestions and information whereby including and any of results can comprise of posts. Additionally embodiments of the system performing queries from a user whereby the results may be displayed in various user interfaces differently to include images, links data, objects, users, events, news, locations, proximity, suggestions, and information that may take the form of posts and other posts. Additionally in some embodiments, other posts may be referred to as similar and/or equal to one or more posts within a system.

Advertisements coinciding with posts, objects, apps, and other user actions. For example, user couples to posts and in other embodiments a user are coupled to and posts coupled to posts and ads. User is coupled to posts and ads. Other embodiments, users are coupled to objects wherein objects are coupled to one or more posts and ads.

Additionally embodiments may illustrate methods for creating posts within digital media that may act as advertisements. Refining the digital media or posts can also save progress, help and go forward with progress. For example a user can search for digital media and content to post where one or more advertisements may or may not be shown to a user. Advertisements within digital media and content can have advertisements with one or more digital media, content, text, payment, and strategy. A user can upload one or more photos. Searched photos can be found through the web. One or more points of digital media within posts. In some embodiments corresponding points within digital media may have one or more associations identified and complementing keywords.

Embodiments may present information that may also be relating to one or more third-party providers, third-party platforms, developers, local listings, ecommerce, API, or any system aiding or connected to the system of the disclosed invention. An API can be a pass-through, whereby a single API method to funnel request to a particular backend service. Any API can specifying responses based on an HTTP request, or a URI requesting content. API is most commonly known as an architecture that makes it easy for one application and incorporate capabilities or data from another application. API's simplify entry points to application logic and data, while also adding to or consuming APIs enable developers to easily access and reuse application logic built by other developers. In some embodiments, web APIs provide almost the same capabilities over a network whereby exposing them directly, while adding a management and visibility layer.

API makes it easier for users to have open access to their data. In some embodiments API's may follow principles of RESTful whereby enabling a user or combination of users and applications to call HTTP GET, POST, PUT, and DELETE methods regarding APIs. In some embodiments GET would retrieve a list of resources or the profile of a specific resource. POST would create a resource, or one or more parameters, performed an action on a resource. In some embodiments, OAuth access tokens or other tokens, use the POST method along with the parameter. Additionally embodiments may use the PUT method to update existing resource and DELETE method to delete an existing resource. In some embodiments the system when incorporating API or technology similar to an API may require the use of a client id. A client id serves as a simple method to associate a user with a server, script, or program with a specific application. However, some requests require authentication or requests made on behalf of a user. Authenticated requests require an access token. These tokens are unique to a user and should be stored securely. The system could embody a dynamic API or operations where the GET method retrieves a list of resources, POST creates a new or deletes a resource, PUT modifies an existing resource, and DEL removes specific resources. The user may ask for information in JSON or XML or any other compatible format. When requesting in some embodiments a user may ask for partial resources (field=a, b, c, d(m,n)) or other parts like statistics, advertisements, suggestions, etc. additional embodiments may include temporary post(s) created with a sequence of frames comprising of one or more advertisements, documents, digital images, digital video, sounds, digital albums, graphics, augmented representation, links, events, articles, apps, text while also containing one, a plurality and/or combination of data, metadata, metatags, EXIF data, keyword posts, hashtags, comments, favorites, text, links, location, entities, objects, entries, places, and users. The system may also create these in temporary post in runtime based on the user or one more user's interests, habits, active participation, ownership, individual, keywords, posts and/or any interaction with the system or other systems where data is available on said user or users.

Embodiments allow users to specify a plethora of access and requests from the user. Within a given system all apps have basic read access by default. Other embodiments extend access such as liking or favoring, commenting, or relationships, users specify based on the use or need of the basic to read any and all data related to a user (e.g. following/followed-by lists, photos, etc.) where in some embodiments basic needs refers to an API and whereby some include default settings. Other features of the API may include comments (create or delete comments), relationships (follow and unfollow users), favor/likes (like and unlike items) while also embodying other functionality that incorporates features similar to creating, posting, publishing, read, get, update, referenced place, referenced users, referenced posts, referenced objects, add/cite objects, add/cite users, add/cite page, adding content to posts, content tokens, app tokens.

The system incorporates various types of data like an image (just one type of digital media) and a user interface like page viewer, action bar and other information like user profile image, username, location, link, crawled information favorites, shares, comments and relating button. The related buttons brings up association related to digital media. The system can relate data and information between digital media and posts through various methods. For example the system can match pixels and colors, bring up the highest ranked digital media or posts, by one or more links or urls, metadata, objects, posts, posts coupled to other posts, followers, followers users or by other methods like explained in and between one or more user and relationships. In some embodiments, methods may include using proximity, or objects, or product. Additionally examples may be taken from a variety disclosed in this invention.

Features with buttons may sometimes show with different symbols that may resemble a phone, envelope, heart, star, magnifying glass, post, user, food, fork, knife, building, city, home, etc. are not meant to limit the scope of the invention. Where symbols and meaning can be changed, or not exist where the equivalent function will still remain. A user may search for keywords along with the digital media, where the photo and keywords are complements to one another and provides additional context to users search query. While also providing additional Information and explanation of certain features and action does not limit the ability of various implement/features, features and expanding of features, buttons, etc. from performing or for methods further explained for one button does not limit the function or ability of another button. Buttons and features with buttons vary depending on situations and/or associations. Figures are meant to show examples of various embodiments, while also flow chart illustrations, screenshots, block diagrams, diagrams while also include coupled, links, and paths may include additional or fewer actions and procedures.

Further defining a system local data can be presented to a user for the best results and some of the best deals. For example proximity or near a user illustrates a venue to park, steak house, tours, parking deal, show more and something else as well as search options a user can interact with any of these provided by the system, developers, advertisers, third party providers and or third party platforms. Other information and data could be presented to a user like rating, deals, live coupon with and without time restriction, in store coupon, other posts, images, other posts etc.

An example would include sharing something that someone else wrote or posted something that was interested (in some embodiments the system defines this as shares within the system whereby may provide a link to the referenced post or digital media). Posts, digital media, content, apps, documents, can be placed or organized into albums or categorized for search. Users within the system can follow, favorite, comment and message almost and mostly anything under the umbrella of the system. The system is not classified to one type of interface, for example some deal with buying or selling, others with networking, the disclosed system operates in different levels providing a platform for all types of classifications can run one, furthermore through the system API or portals the community, developers, third-party-partners and like can build and use new and pre-existing system with the disclosed systems. This also includes grouping. The system is accessible through various types of devices and through applications, networks, web-browsers and third-party providers. For example some embodiments may include relative predictions of embodiments where posts, digital media, documents, shares, or other data and information for one or more users that relate to the viewable post or to the user and the searched content, or to any connects or interactions within the system like favorites or follows whereby the information shown to the user is sourced from any combination of embodiment handled by the system and/or managed by the system, and from third-party providers.

Other embodiments may lead to sorting posts, digital media, documents, or information found within the system, this information can be stored, scored and referred to within the system for one or more users. The system in some embodiments operates passively to maintain, manage, while also collecting information. The system is not defined by who can post objects or a schema but more if it is mathematically possible to create. Posts and digital media referring to other posts and digital media can be compiled, organized, grouped and shown to one or more users based on search relevance. In some embodiments, referenced photos, posts, or digital media show all or just the most scored information relating to the user. Users will also be able maneuver through the user interface to see others who have posted to the original whereby creating an interconnected associations throughout the system aiding with multiple levels of functionality and performance.

The disclosure is also not meant to limit video embodiments relating to aspect ratio which describes the proportions, orientations or dimensions of video, screens and/or sequence of images whereby comprising to form a video. Video formats may also include wrappers and codecs where codecs are used inside of a container and because of this video formats can be confusing. Also a user can create posts at a later date.

FIG. 1 illustrates a diagram of a network 100 where in some embodiments coupled to a system 120 and a user 110, where a user may interact with display 111, memory 112 and/or keyboard 113. The user 110 may interact with one or more user devices that comprise of one or more and/or combination of displays 111, memory 112, and/or keyboard 113.

Figure 2A:
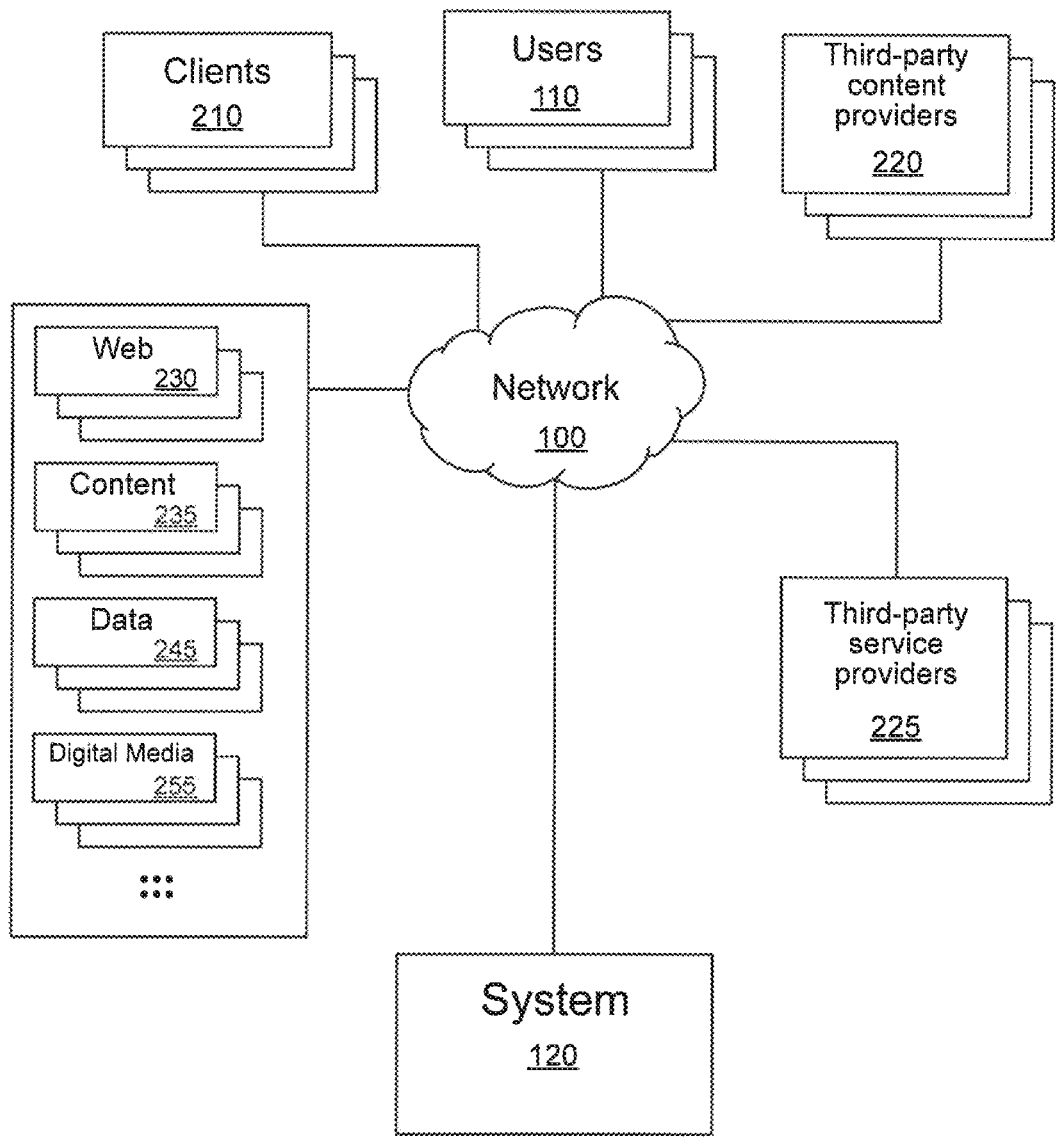
FIG. 2A is a block diagram of illustrating a system communicating or in network with other platforms providers and content.

FIG. 2A a system 120 may be comprised of, or works in parallel and/or support one or more users 110, Clients 210, Third-part content providers 220 and/or Third-party service providers 225 whereby the coupled system in some embodiments operates through as system. The system collects, stores and organized content such as users, user profile, data, information, businesses, inventory, logistics, advertising, articles, digital media such as images, video, sound, documents, and or objects that are created, uploaded, links, posted, referenced post, referenced defined, or allocated by one or more users 110, Clients 210, Third-party content providers 220 and/or Third-party service providers 225. A system can also find data 245, Digital media 255, content 235, Web (content, sites, links, information, data, etc) 230. By various techniques and by using one or more information/data or services from a third-party (these techniques include scraping and/or crawling data from the World Wide Web).

Figure 2B:
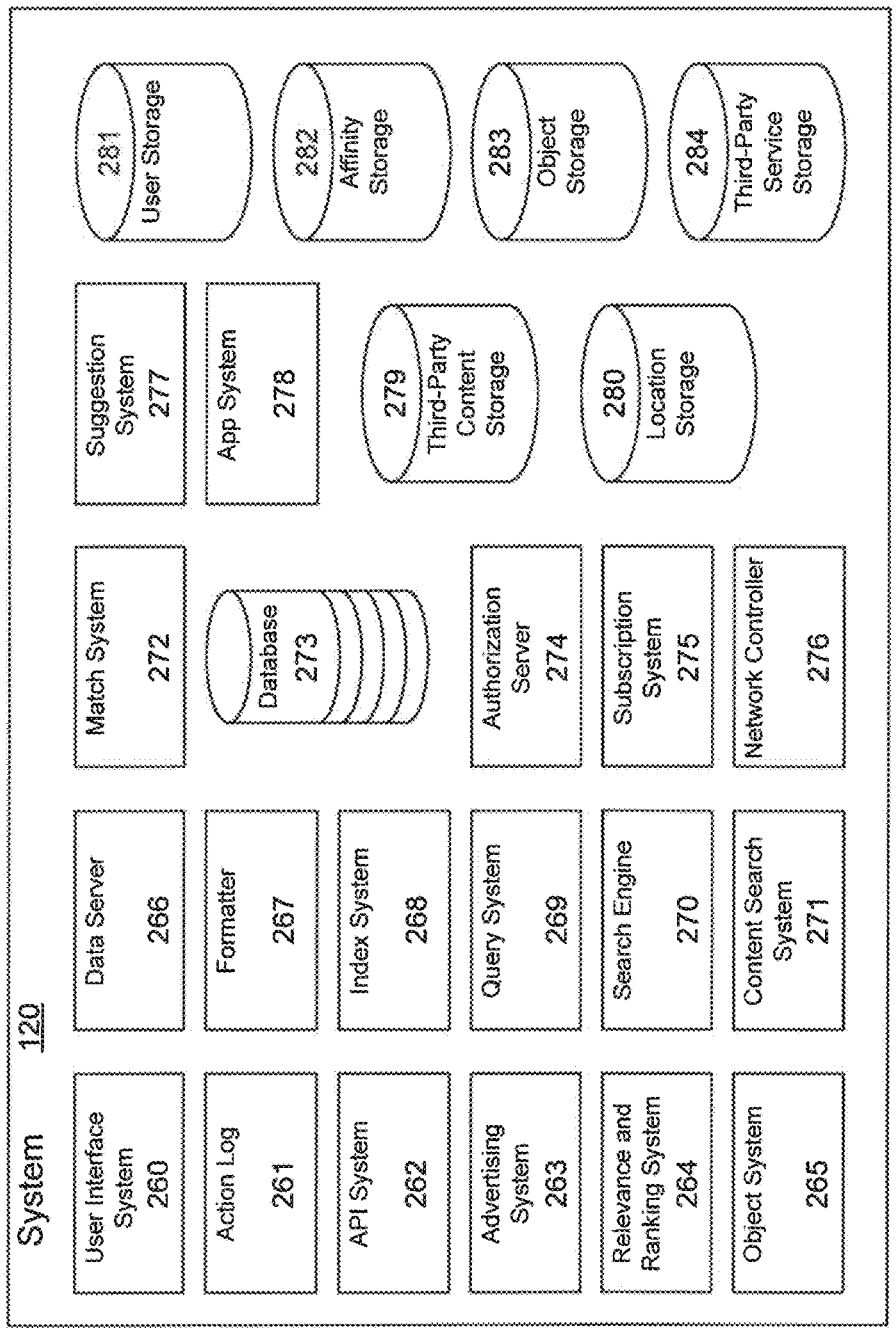
FIG. 2B is a block diagram of illustrating a system.

FIG. 2B illustrates a block diagram of a system 120, in some embodiments may contain one or more systems, components and/or combination systems, modules, storage, database, servers, and/or software. The said system in one embodiment may include a user interface 260, Action Log 261, API System 262, Advertising System 263, Relevance and Ranking System 264, Object System 265, Data Server 266, Formatter 267, Index System 268, Query System 269, Search System, Search Engine 270, Content Search System 271, Match System 272, Database(s) 273, Authorization server 274, Subscription System 275, Network Controller 276, Suggestion System 277, App (Application) System 278, Third-Party Content Storage 279, Location Storage 280, User Storage 281, Affinity Storage 282, Object Storage 283, and Third-Party Service Storage 284. The system in some embodiments may also include one or more of the same type of server depending on the needs of the system and environment, implementing one or more nodes.

The server system may calculate a user's interaction and response to searched and ranked data information. In any case the system may store and/or refer any data within the system and/or any other component of the system and/or with any other third-party system, provider or client. Data may be stored in a data base where one or more indexes and or reverse indexes used for the communication between users and clients. Components of the systems may include one or more bus, processors, memory, ROM, I/O devices, storage, processing logic, RAM, microprocessors, and interface for communication. The query system 269 embraces a plurality of parts. Examples would include single region query, a multi-region query, query and/or combination of. In some embodiments a query system may include a query optimizer to aid in determining the most efficient way to perform the query. Search engine 270 uses the response from a user query of keywords and digital media (documents, images, video, sound, graphics, commands etc) and retrieves the best results in response to the user query, in some examples results would include webpages, documents, digital images and/or parts of digital images while also including social data as posts, uploads, posts, and referenced post. Embodiments in the said invention are to provide the best possible results to the user query and interaction with the system. Additionally the system maybe designed and set for users browsing the Internet and/or displaying results that were broadly searched throughout the Internet. Content Search System 271 is a system that searches multiple data types, understanding the similarities of various data types. In some embodiments data is unstructured whereby content may be modified and may include website content. Within the scope of the invention the system may be modified and expanded for use in various ecommerce, logistic, image galleries, forums, applications, etc. other example may include a match system that identifies sorted and unsorted conditions, understanding variations, hits, and landing pages. The said system may include one or more corpus whereby includes large amounts of information relating various subjects. The said inventions would include the World Wide Web and user inputted data, while also including resources and publications of literature, real-time interactions and content, presentations and scientific, etc. In some embodiments a system that browses, finds and stores information from the World Wide Web for example such methods include web crawler, spider, scraping, and/or bots. In some embodiments the web crawler may re-visit or a user/webmaster may choose to be excluded from a crawl list, etc. Within the scope of the said invention the crawling system may include a form of specialized crawling systems that finds data that may not be atomic but could be relevant to some search queries. The said system may also include the fetching of data, information, and digital media while including digital media that comprises of identified parts and/or associations where other embodiments may include predefined criteria for the crawling system. Recognition server identifies objects in digital media and/or digital media as a whole. Model generator specifies search engine index and/or search index structure based on data. While also including logs action logs 261 and/or activity logs, implementation, process, identification, ranking, and/or score, data, information, and digital media while including digital media that comprises of identified parts and/or associations. Whereby including probability (while including hyperbolic, kernel, and/or polynomials) that data, information, and digital media while including digital media comprise of identified parts and/or associations (allocations) will be selected and/or generated for results to user queries. Within the said invention that may additionally include logs, data, models and/or testing including information inputted by one or more user for data, information, and digital media while including digital media that comprises of identified parts and/or associations whereby probability, values and or scores relevant to the data, information, and digital media while including digital media that comprises of identified parts and/or associations is generated and/or stored. Other features may include various types of languages of data, information, and digital media while including digital media that comprises of identified parts and/or associations to where it may incorporate links that are scored and ranked while also being manipulated and rendered. The system may include already manipulated and/or rendered data, information, and digital media while including digital media that comprises of identified parts and/or associations. Trust and/ or Authorization server operates as a key server or security for users. The Authorization server 274 is to provide a higher level of security of private/personal information and relationships and are some embodiments separating user data in various layers and location for security. Automatic data collection may run in parallel with recognition server to automatically identify objects data about objects and inputting data directly in various computer and/or server systems. This may also include identified objects with various barcodes, RFID, biometrics, OCR, acoustical, etc. User Interface System 260 provides ways that user may interact and perform queries. Methods may include browsers, websites and/or applications that users can use. The system may also include various indexes that enable digital media to be indexed in various types of arrays and/or the system may also use reverse indexes. Whereby also recognizing parts of digital media and associations. Index may include index mapping, subject index, and/or inverted index whereby data sets are created to retrieve data, mapping raw data, and/or content describing of digital media, while other forms may include web indexing. Media rank may include a weight and scoring system in order to measure the importance of digital media. Data server 266 comprises and may comprise of various embodiments including software and hardware to analysis data, store data, archive data, and/or data manipulation. While also including one or more parallel servers that may also include accounting, billing and an advertising platform. One embodiment may comprise of a correction/context system automatically changes or suggests when a user performs a query search whereby showing response to search queries that aid one or more users in finding the best, most relevant, correct and in context results. A Score system or Relevance and Ranking System 264 may include one or more methods of scoring and/or weighting keywords, digital media, and/or parts of digital media. In some embodiments a reputation, relationship and/or relevance score may be given to various allocations, descriptors and/or factors. The said Relevance and Ranking System 264 may work alongside an Advertising Platform/System 263 or Third-party Advertising Platform/System. Database(s) 273 comprises of one or more databases to a collection and organization of data. In some embodiments one or more databases may include index database, score database, unique ID, image data, digital media database, while also including various database and/or database that handle more real-time events compared to informational data (increasing the response). In some embodiments the system may comprise of storage for one or more features within the system like user settings, affinity storage, object storage, third-party service storage, third-party content storage, location storage and app storages, whereby including any embodiments stored in connection with any and/or combination of systems, servers, or functions of the said invention system 120 and/or API system 262.

Figure 2C:
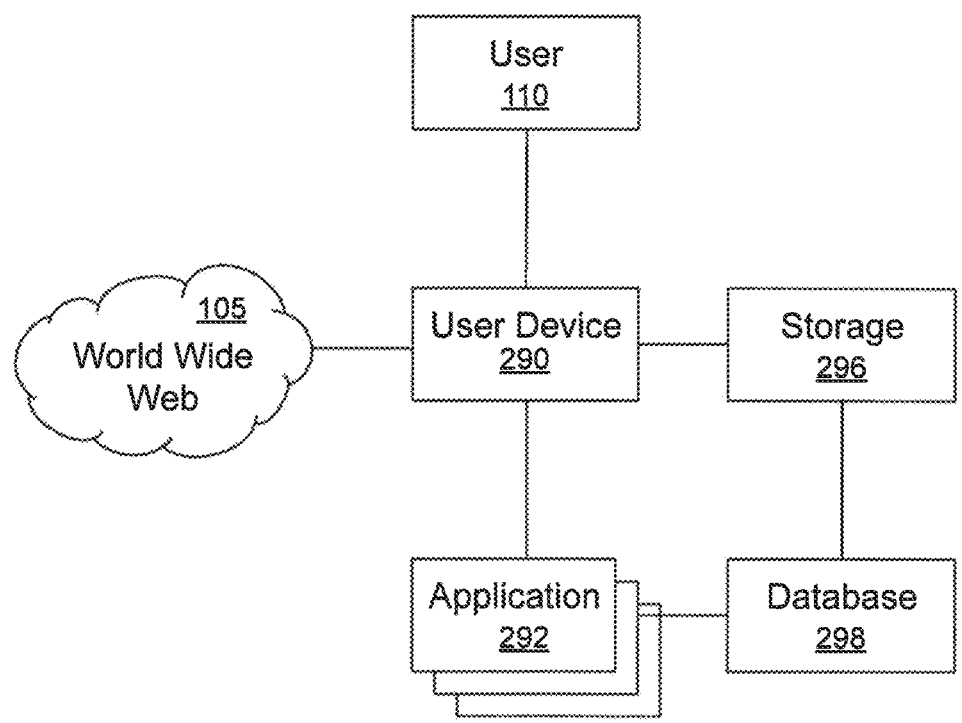
FIG. 2C illustrates a user device couple to one or more networks and components.

FIG. 2C illustrates a user coupled to a user device whereby the user is granted through the user device to send and receive data through a network or the World Wide Web 105. The user device 290 may in some embodiments interact with an application 292 that also uses the user device to connect to a system 120 through the network or World Wide Web 105. When a user interacts with an application 292 through a user device the receiving of data may result in persisting storage 296 in the form of a database within the user device 290. For example if a user searches for an image the user device does not need to connect with the system to retrieve the already accessed image and simple recalls the image from the storage of the phone.

In some embodiment's posts are referred to object whereby each object post may or may not contain content. Content is defined as but not limited to any digital media, file, application, (or as described or referred within the scope if the said disclosure) and/or similar digital content that can be uploaded and/or stored within the disclosed system. In some embodiments a user creates an Object with content, where the same or another user created another Object with content. Additionally the same or another user creates a new Object with content from the Object. Also the same or another user creates an Object from the content and/or any part or defined/referred to region of the content. The system may also result in the same or another user creating and Object with content from the Object whereby another Object was created with content from the Object or from the content of the Object. Within the scope of the invention or said disclosure while not limiting other embodiment the said system may define methods for referring and or embedding posts (Objects) from Posts (Object) and from Content.

The said system could be viewable from a browser or mobile device. In some embodiments a user could search for a food item or location. For example a user could input data within a search box, the query is sent to the system wherein one or more results with be presented in the web browser to the user. For Example a map or location, digital media or posts and other relevant information and advertisements. The user can list results and view more on the next set of results.

Figure 3:
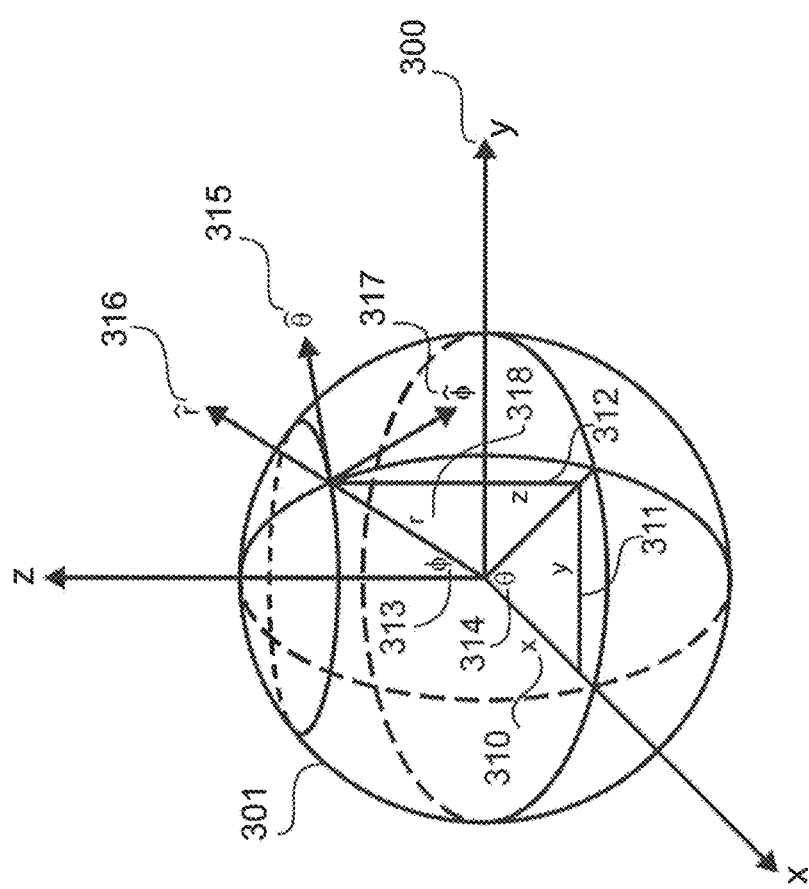
FIG. 3 illustrates a spherical coordinates associating with the system.

FIG. 3 illustrates a spherical coordinates associating with the system. Spherical coordinates in some embodiments are referred to as polar coordinates. The system may use additional methods to use spherical coordinates in when used in relation to corresponding and applicable digital media that relates to video, images, augmented reality, geographic or media viewed that is recorded or media in real-time. In some embodiments the spherical points relates to (radial, azimuthal, polar) where additional components could be added like (radial, azimuthal, polar, time) or (radial, azimuthal, polar, geo-location). In some embodiments the coordinates can relate to a flat surface that corresponds to a 360 degree environment or like. The x-axis, y-axis, z-axis 300 and x plane, y-plane, z-plane describe at the intersection as the origin where points relate to around the origin. Not limited to a sphere 301 but in some embodiments the relation formed by one or more radius. The angle between the x 310 and y 311 plane θ 314 or azimuthal angle and ϕ the angle out of the plane or polar angle and r 318 the distance radius from a point of origin. In some embodiments the radial position vector 316 and the tangential direction of rotation 315 and the direction of motion or unit vector 317.

Figure 4:
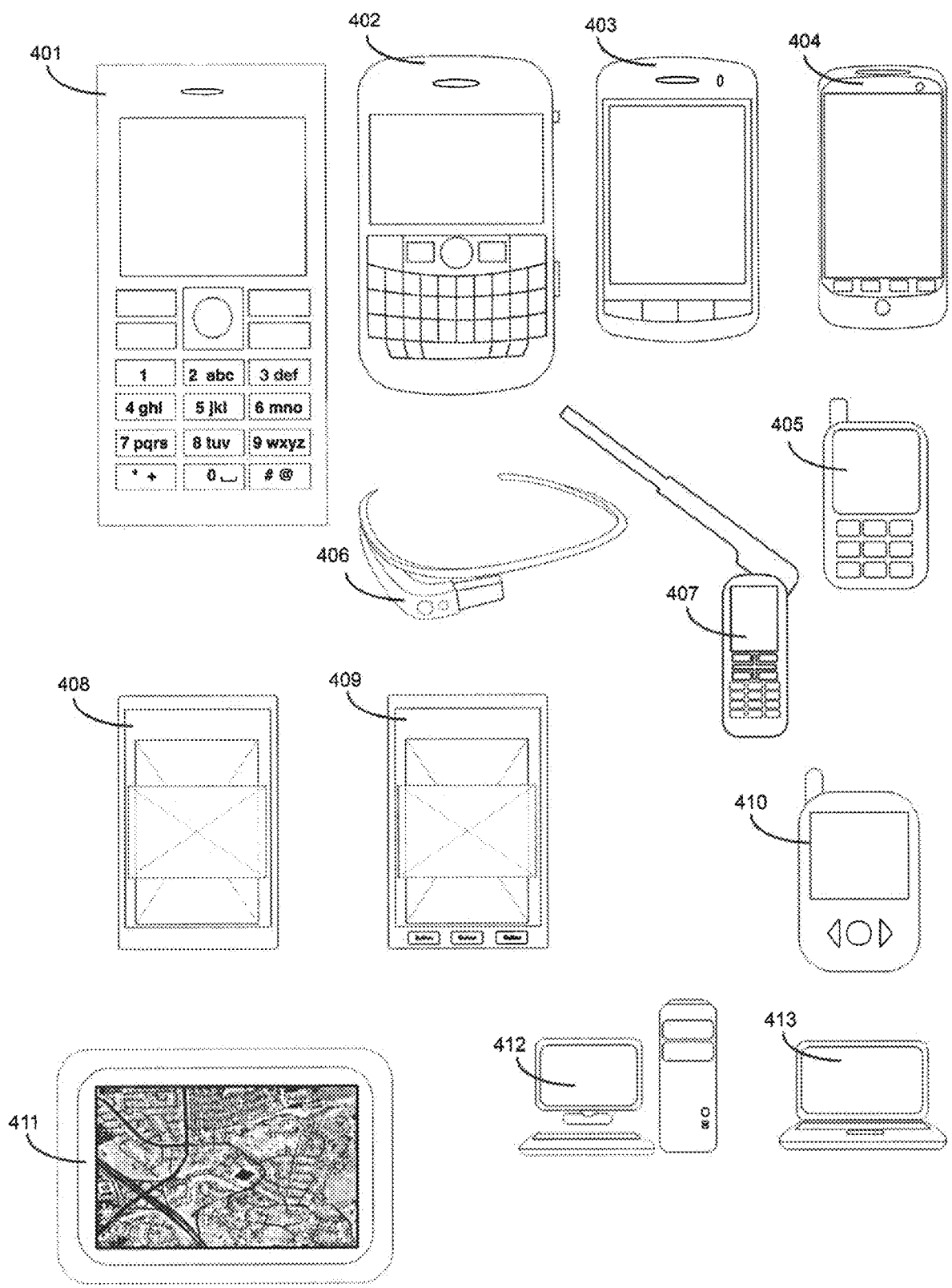
FIG. 4 illustrates a plethora of user devices.

FIG. 4 illustrates examples of user devices that could be used with the invention apparatus. While the said invention may have a focus on devices with touch capabilities, devices with no touch capabilities could take advantage of the invention apparatus. Where users could activate or implement features using their finger, button, scrolling wheeling, mouse, track pad, pen etc., while also not limiting the user to future development of devices that incorporate voice recognition, artificial intelligence, retinal recognition, etc. In some embodiments user devices could represented while not limiting the scope of user device by a touch-less phone with buttons) 401, a touch-less phone (with scrolling and buttons) 402, touch screen (with buttons) 403, touch screen (with buttons and scrolling) 404, wireless phone 405, headwear accessories (with multifunction capabilities) 406, satellite phone 407, multifunctional touch device (without buttons) 408, multifunctional touch device (with buttons) 409, simple device 410, GPS device 411, desktop computer 412, server, laptop 413, machine, artificial intelligent machine, or Smartphone, etc. Devices connected through the communication network using the Internet, cellular connection, satellite connection, intranet, local area networks, wide area networks, wireless networks, and or related. While also when applicable NFC (near field communication).

Figure 5:
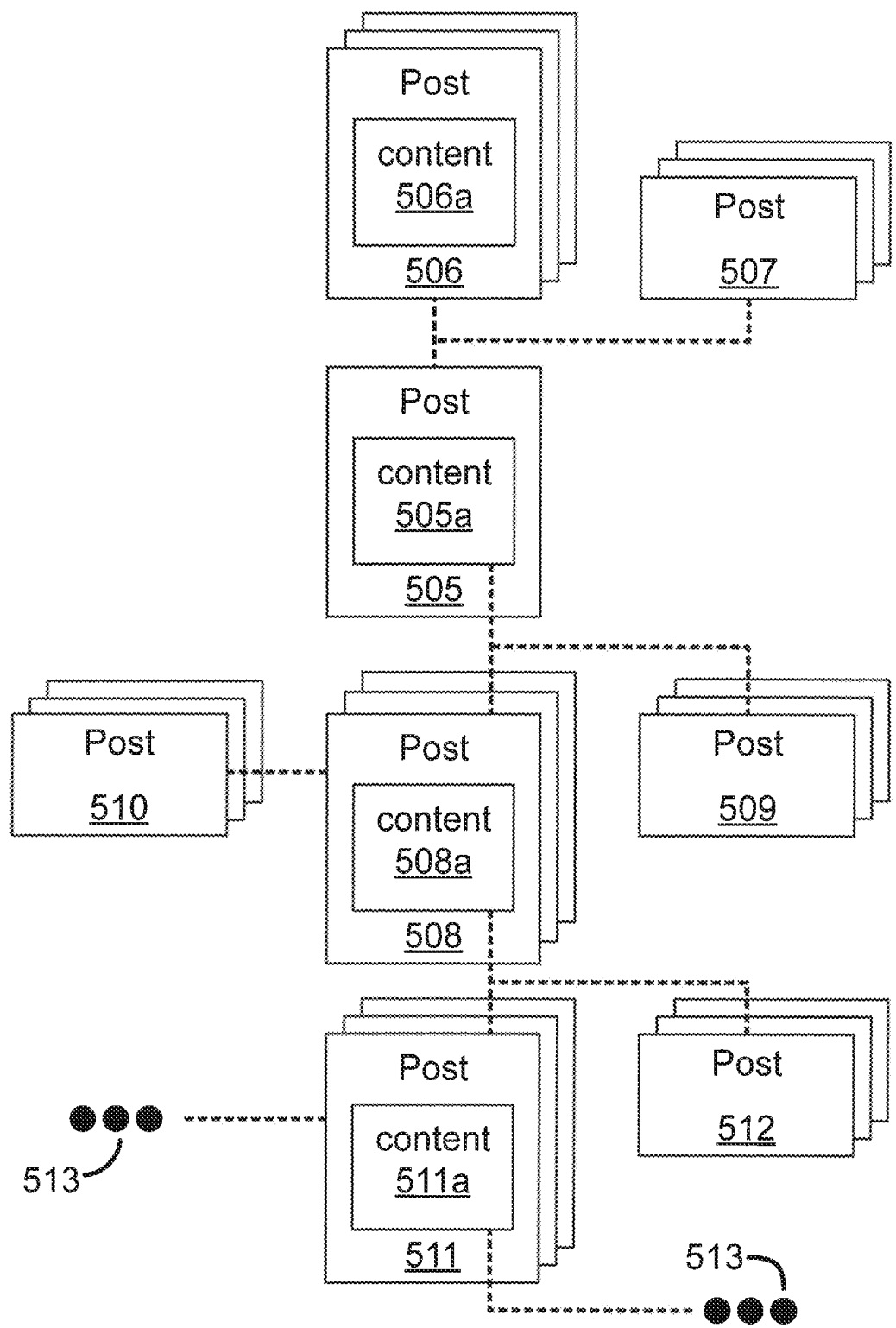
FIG. 5 illustrates a cross comparison between posts, other naming of items similar to posts performed by users or the system.

FIG. 5A shows how one or more posts are created, uploaded, shared with the system. Posts can be set to public and/or private while also being shared though the system by users who query connected user, users using one or more third party services and/or APIs. User who are connected to the user who posted to the system may be updated in a feed or list of recent activity within the system. Embodiments illustrates that a post can be made of any, a combination of, and one or more text, digital media, links, documents, files, and data. A user can have a series of posts, one post is coupled to the previous one. In one embodiment the system may classify various posts as posts, and posts of another post or referenced posts. While post theoretical can have an unlimited number of posts and more posts coupled to those posts that are then reshaped and/or added to by one or more posts for every post within the system. In some embodiments posts may refer to posts and posts may refer to posts of other posts, furthermore posts may refer to posts of other posts. Any number of posts that are part/coupled to a post can have added allocations to further categorize and/or define the post or subject. In the disclosed invention posts of posts and post of other post are identified to be the same, while also including posts from posts and posts from post from a post. Further illustrating posts, posts within posts and referenced posts are treated as posts referenced any part of post a where posts can have one or more posts in linking to content provided by users whereby each post can have one or more posts of other posts. One embodiment may also include posts that are linked to a post having one or more posts linking to one or more posts and/or combination of posts. Whereby each post has one or more posts linking the posts of other posts and referenced posts.

A user can create posts with content. In some embodiments the same or another user can create a post with content or a post without content from the post with content. Post that contain content may include documents, photos, videos, sounds, graphics, augmented representation, links, events, articles, objects, and apps. In some embodiments a user can create posts that contain content originating from any part of a post with content. For example any users can create post with content or posts without content, post with content was created from the content of post, and within the disclosed invention with some embodiment post with or without content can be created from the content or parts of content of a post. In some embodiments other data may be include like a region, metadata, location, sequence, frame number, region associated with frame number.

Posts that contain content may include documents, photos, videos, sounds, graphics, augmented representation, links, events, articles, objects, and apps. In some embodiments a user can create posts that contain content originating from any part of a post with content. Post with content was created from the content of post and within the disclosed invention with some embodiment post with or without content can be created from the content or parts of content of a post. In some embodiments other data may be include like a region, metadata, location, sequence, frame number, region associated with frame number.

The system in some embodiments can have one or more, and combination of posts references pointing to other posts and posts of other posts. Whereby anything within the system as illustrated in can point to any number of Posts, referenced posts where data and relationships that are formed by linking can be ranked and scored whereby determining the relevance of every interaction with the system. Further describing a post can point post whereby linking post to relationship of post and posts of another post. Added to embodiments within the system a post being pointed to and pointing to other posts and posts of another post whereby links theoretically unlimited number of posts, posts of another post whereby forming relationships and paths to a number of links, digital media, articles, contents, files or documents that can be shown to one or more users when a user uses a system. In embodiments of the system relationships are scored and ranked whereby showing a various levels of significant to users.

Further defining one embodiment that includes relationships between the same or one or more user's posts. For example if two users owned two different threads of posts each and combination of posts. To specify further post can point/relate to post. Any post can be pointed to and pointing to any number of other post, for example post can point to posts and point to post. The post point to can also have one or more other posts, posts, and/or referenced pointing to post whereby post can point to post can point to a post. Any user within or outside the said system pointed to in as a result in any part or combination of any post coupled can be scored and ranked to show any relationship or relevance that can be used now or later for any number of correlations like advertising or results and feeds.

Figure 6A:
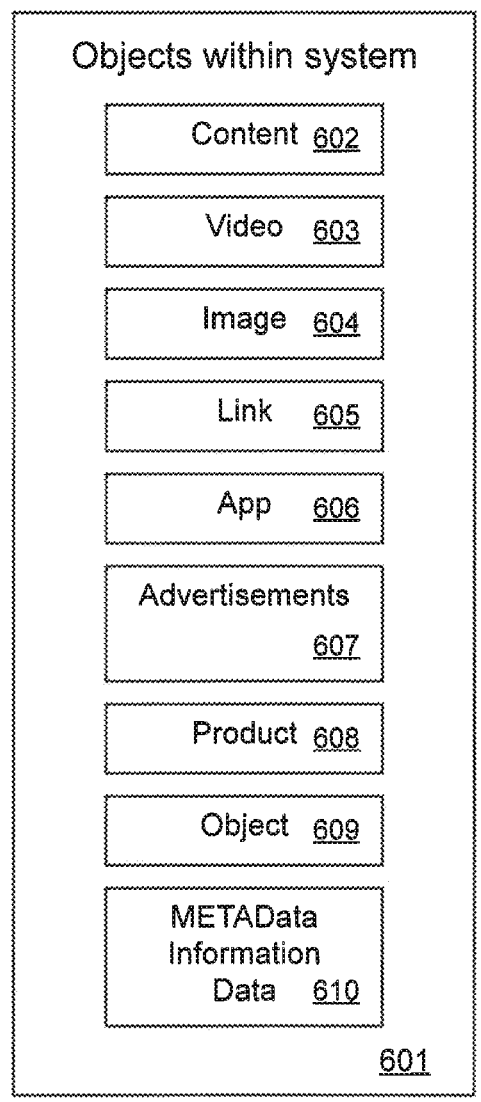
FIG. 6A illustrates a simple representation of objects within the system.
Figure 6B:
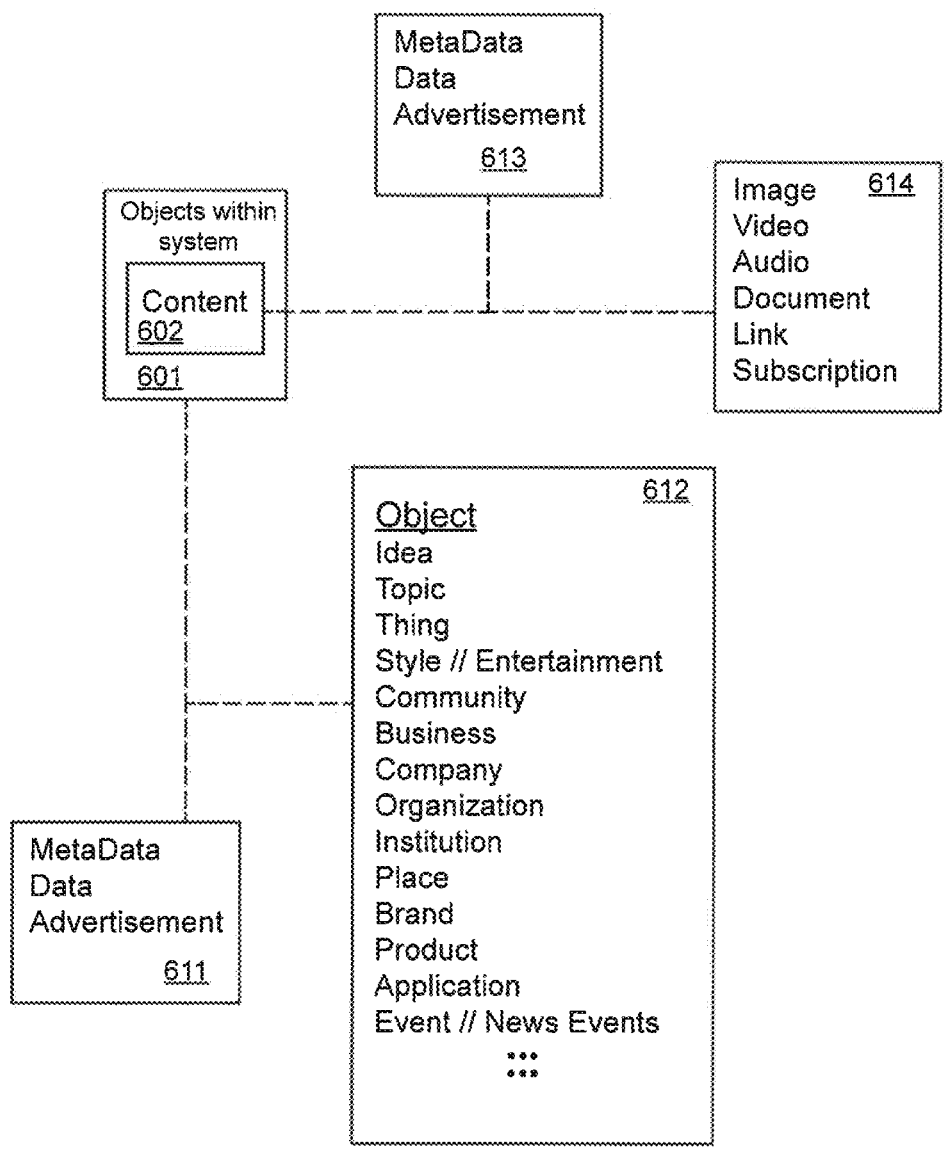
FIG. 6B further illustrates objects within the system, content, data, and objects.

FIG. 6A-6B illustrates in some embodiments an Object 601 that may have one or more additional embodiments such as content 602, Video(s) 603, Image(s) 604, Link(s) 605, application (app, apps, and applications 606), Advertisements 607, product(s) 608, Object(s) 609, metadata, information and data 610. Object 601 are created similar or the same as most posts, and can interact with one or more systems or third party providers. In some embodiments the system may relate information within a post or Object 601 with content 602 whereby content can be one or more and/or combination of image(s), Video(s), Audio, Document(s), Link(s), and Subscription(s) 614 whereby also including one or more other information like Metadata, Data and Advertisements 613. Furthermore, Object 601 containing one or more Content 602 and Object 601 can contain one or more additional objects whereby representing an Idea, Topic, Thing, Style or Entertainment, Community, Business, User, Company Organization, Institution, Place, Brand, Product, Application, Event or News Event, and etc. 612 while also containing MetaData, Data, and Advertisements 611. In some embodiments the Object can refer to items in the content and items within the object post itself.

In some embodiments a system that is not typically pointing to or is referred to only one reference or association, however the system disclosed can refer to one or more items and bidirectional. For example in some embodiments users can refer to each, and to links, users and can refer to and from posts and to links, users can refer to and from images and to links, users can refer to and from links, users can refer to and from videos and to links, users can refer to and from apps and to links, users can refer to and from object and to links. Furthermore tags (or posts) can refer to and from images, tags (or posts) can refer to and from Links, tags (or posts) can refer to and from videos, tags (or posts) can refer to and from apps, tags (or posts) can refer to and from objects, tags (or posts) can refer to and from entities, tags (or posts) can refer to and from ads, image can refer to and from images, image can refer to and from post, link can refer to and from post, video can refer to and from post, link can refer to and from Image, and an Image can refer to and from link. Most things within the system can be referred to even when it is not directly linked or the id stored within the object. In some embodiments data indexed/reverse-indexed and data mined can find the similarities among any interaction within the database.

In addition to a system referencing other posts, objects, posts and users queries can look up specific associations identified by ids and/or type, whereby ranging queries for any incoming or outgoing relationships. Other relating information may deal with count or number of something within the system affecting other objects, posts, posts, and users. Clients may also request data from the system whereby adding, persisting to or retrieving from the system. Various other systems may work in parallel to optimize the disclosed system while also migrating or cloning same or similar clusters to handle load spikes. The system measures the load on various parts and facets within itself whereby effectively managing to provide a system that is up-to-date and optimally performed for the end user. Additionally incorporated for the web and mobile devices whereby effectively presenting relationships and associations. Examples of embodiments within a server system disclosed in the invention whereby $object_a$ is created by a user. $object_a$ can also contain content. In some embodiments $object_a$ the can refer to and from a user (the user who created object, or another user) where the another $object_n$ can be created embodying any items found typically for an Object which may also include posts other Object, content, data, favorites, text, comments, etc. additionally $object_a$ can contain or have text, favorites, data, content, and comments referring to. Comments can also have its own favorites. $Content_n$ can have data comments text favorites and other $object_n$ referring to and from the $content_n$ where comments can have favorites and one or more $object_n$ can be created from the resulting $content_{n'}$.

Everything within the system can be searched and indexed whereby organizing and scoring Objects, data, comments, favorites, text and users based on a pleather of collected data and/or ranking and/or sorting.

Objects, posts, posts within posts and referenced posts, can have relationships to and from one or more and combination of other posts, posts within posts and referenced posts that are and are not coupled. Similar to relating posts, posts within posts and referenced posts with one another, links within each posts, posts within posts and referenced posts and objects and from websites. The system can either find or support links that relate to one or more posts, posts within posts and referenced posts, and objects. For example links can point to any number of posts, posts within posts and referenced posts and any number posts, objects, posts within posts and referenced posts can point to links. In some embodiments a user may have posts, illustrations, documents, or images on a website or other applications, whereby the posts, illustrations, documents and/or images are supported by the system. The API (Application Programming interface) allows one or more user, third-party content providers, third-party service providers, clients, advertisers, and developers to access information, apps, content and data from the system. In other embodiments the system my communicate with other systems, other APIs and one or more user, third-party content providers, third-party service providers, clients, advertisers, and developers can send information, apps, content and data to the system. Various User interfaces can function and communicate with the same system where offering different applications for a plethora of reasons and functions. In some embodiments, coupled posts can refer to links and/or have links embedded within and one or more links can have one or more coupled post embedded. For example posts, posts within posts and referenced posts and reflect a relationship with link, additionally links can refer to or show a relationship to other links, while also not limited to linking posts, posts within posts and referenced posts that have one or more relationships with links. Posts, posts within posts and referenced posts and links can point to links that do not refer to any other post or other link. For example, Post points to links and Links point to Links, Link does not point to any link or posts. In other embodiments, Links can only point to one or more other Links. For example Links and Links can point to each other.

Figure 7:
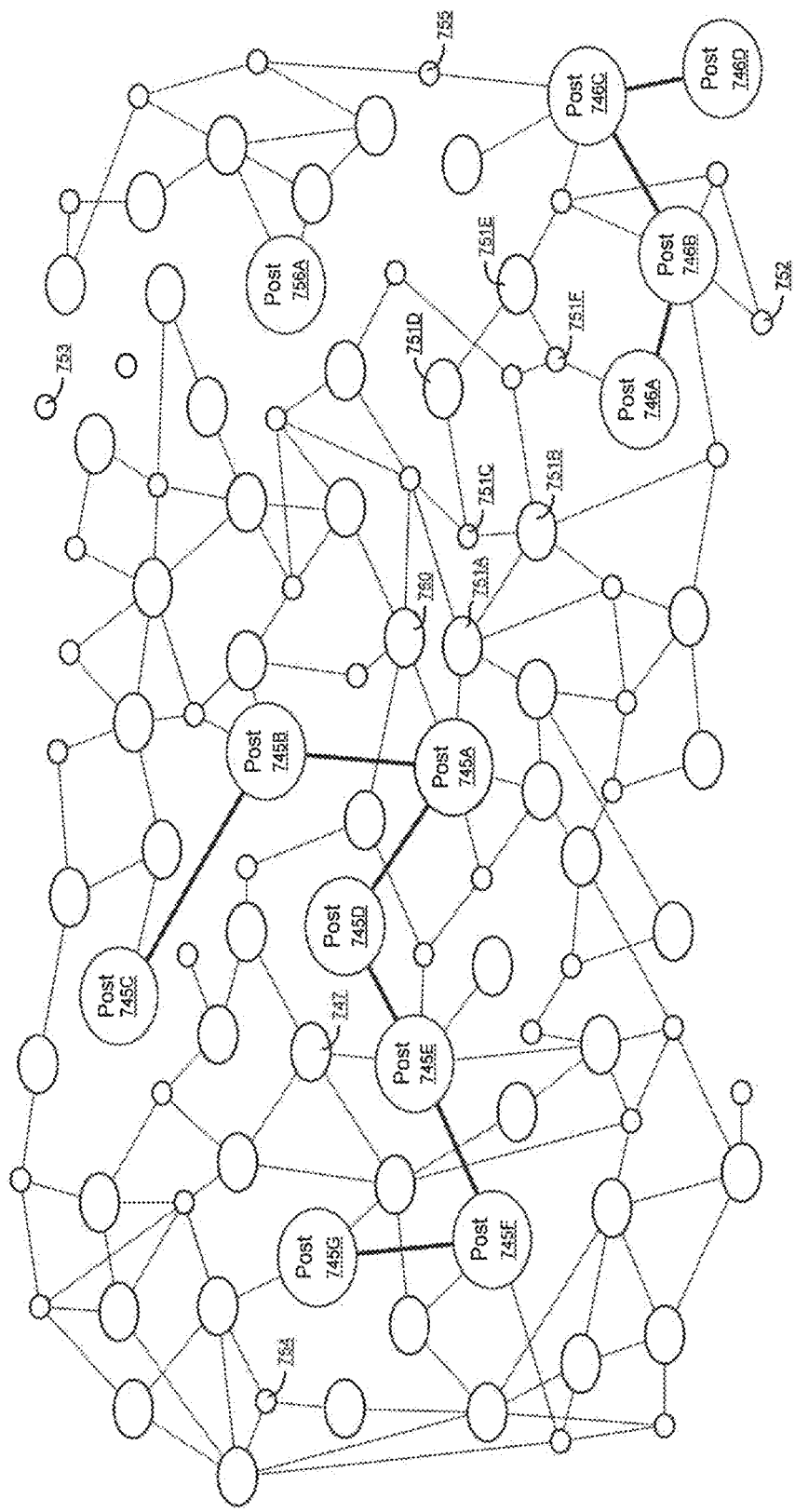
FIG. 7 illustrates one or more posts within a system where posts, data, users, objects, digital media, content, posts, and links may be represented with relationships.

FIG. 7 illustrates one or more posts within a system where posts, data, users, objects, digital media, content, posts, and links may be represented with various relationships. In some embodiments where posts are a simple method for a user to contribute to a system, where in addition to and in most cases the system creates relationships with everything within the system, with third-party providers, developers, content, the world wide web, data and other information. Through a web of data, content, information, digital media, comments, favorites, location objects links posts can relate to one another even if they are not directly coupled by users with the disclosed invention. For example post 745A can have one or more posts coupled like Post 745B and Post 745D. In some embodiments posts that contain content allow users to add or contribute to that same coupled post. Where posts that contain text are limited in the value where adding digital media to coupled posts with just text may in some embodiments be restricted through the User interface or various other techniques. In a very simple example non-coupled posts can link to one or more other posts and coupled post by relating relationships found within and though providers, third-party platforms and the world wide web. In some cases through the internet or intranet. For example Post 745A and Post 746A are distance and not coupled, however using various forms of algorithms, methods, while also determining relationships, ranks, scores and metrics, a path or relationship is found connecting Post 745A and Post 746A. Through various forms of data, information, from the world wide web, links, users, activity, involvement, posts, objects, third party providers, developers, third party platforms, subscribers, locations, businesses digital media and content, the path 751A, 751B, 751C, 751D, 751E, 751F can link and/or connect Post 745A and Post 746A. Data, information, from the world wide web, links, users, activity, involvement, posts, objects, third party providers, developers, third party platforms, subscribers, locations, businesses digital media and content (754, 747, 750, 751A, 751B, 751C, 751D, 751E, 751F, 752, 753, 755) can be identified where the disclosed system will try to relate information to, for anything in the past, present (real-time) and future. The system will continuous try to relate information that has associations and no associations 753. Other embodiments represent a single relationship point 755 that links Post 756A and Post 746C.

Figure 8A:
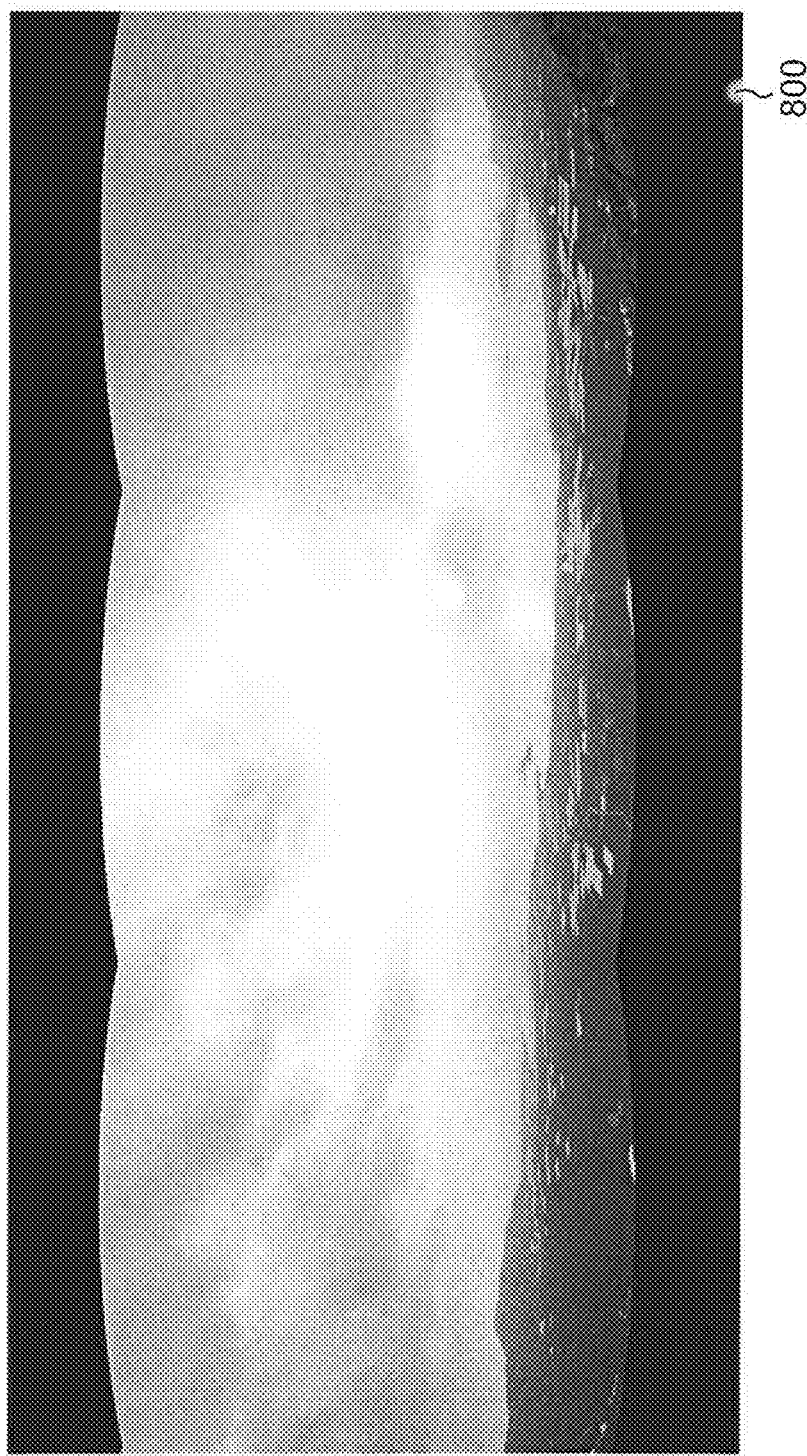
FIG. 8A illustrates the type of media enabling 360 degree video.

FIG. 8A illustrates media enabling 360 degree video and other types of media in some embodiments referred to a media source from a single origin. Other examples would include multiple videos that would corresponds to movement by a particular user. Another example would include real-time people walking and looking at various places in the real world where the added component would include a geotag. Typed of media enabling 360 degree video with points that remain fixed or change per frame and may define points at a various distances where would be a region closer than the farthest region. An embedded post or digital media like video, images or similar where the points moves from the farthest point to the closest points. As the video is played or if viewed in real-time it will appear that the region starts from the farther position to the closest position.

Video can be streamed and or index to provide various types bandwidth connections for every given user. When combining videos for users a more interactive experience a director or algorithm of the corresponding video and position relative to where the current user it looking. These video indexed could be one or more documents of data to switch to lower quality videos or higher and lower quality videos that are separated or split up.

To further define the scope of the method clustering of embedded digital media or information could be done by Artificial Intelligence of retrieving the duster of expected points given the allocated distance between points.

Figure 8B:
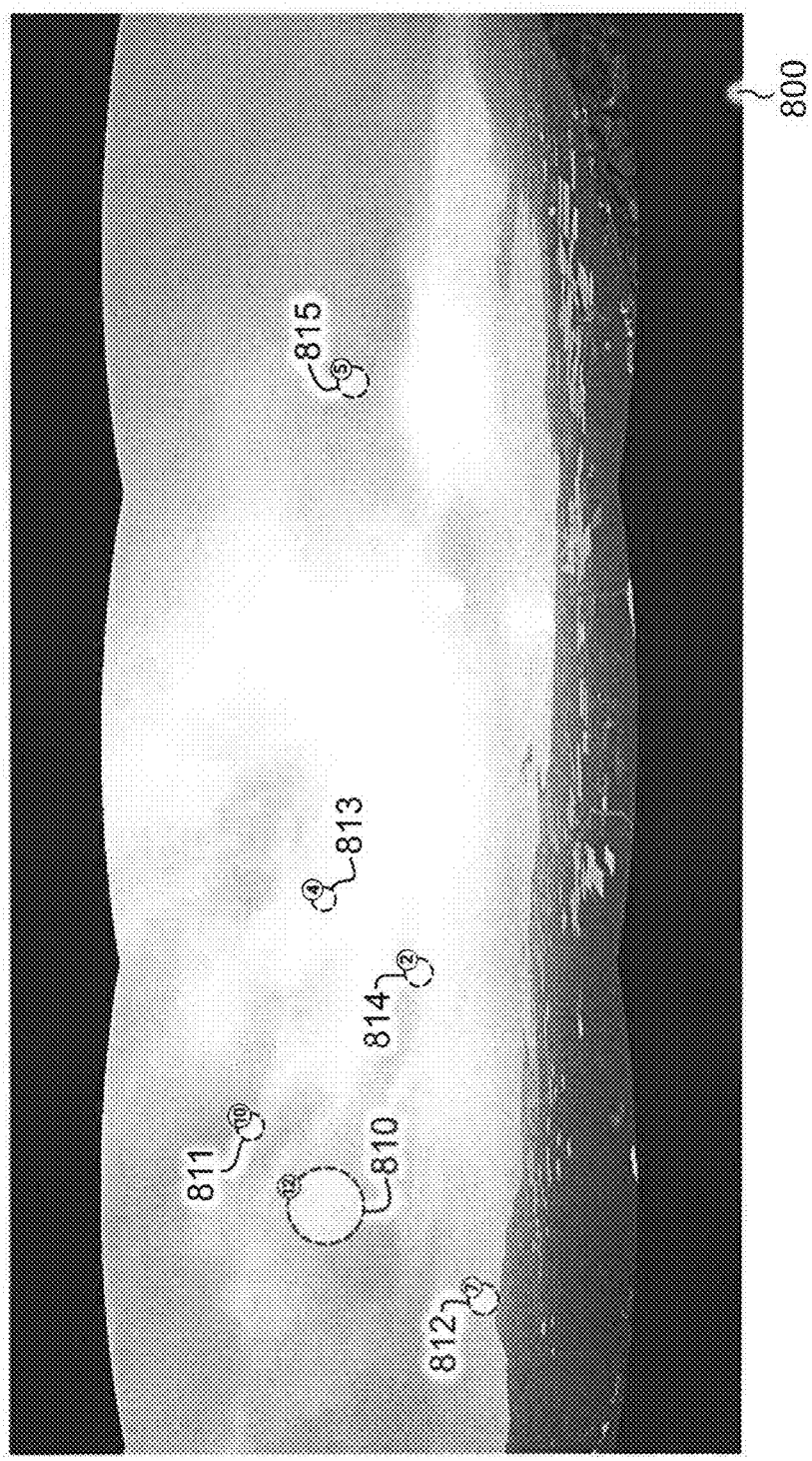
FIG. 8B-FIG. 8C illustrates the type of media enabling 360 degree video with points that remain fixed or change per frame.

FIG. 8B illustrates media with posts within clusters that have reached convergence or have been grouped together. For example, grouped points 810, 811, 812, 813, 814, 815 each are made up of points that follow similar paths. The system also may employ methods that in include implementations for scaling when many users embedded posts within media that use the same points or similar points to one or more other users that embedded posts within the said media. Methods may include the percent that embedded posts within media are together whereby in some embodiments the percent change together equals total together over duration. Other methods include a score for every percent together. The implementation may also include filtering the points embedded posts within media by users or by social interactions, social impact and other embodiments like followers and followings. In some embodiments the overview of video clustering would employ the ability to calculate "cluster score" for each posts within content of the video and cluster posts within content into a limited number of groups using the cluster score.

The system may embody methods to calculating the cluster score calculated mainly in some embodiments running Birch algorithm on every time stamp. At each timestamp, birch algorithm clusters posts within content as if it were clustering image posts within content. If a posts within content as if it were clustering image or video, posts within content. If a posts within content falls in a big cluster, it would gain more cluster score than another retag that fell in a small cluster. Calculate the cluster score for each video posts within content. Cluster posts within content into a limited number of groups using the cluster score. In some embodiments, three metrics used to cluster posts within content. Embodiments with cluster scores calculated mainly via running birch algorithm on every timestamp whereby at each timestamp, birch algorithm clusters posts within content as if it where clustering images or posts within content. If a retag falls in a big cluster, the system would gain more clusters scores of the big cluster, it would gain more clusters score than another retag that fell in a small cluster. Other embodiments include total time together where a 2d-matrix of size posts within content x posts within content that describes the similarity between two posts within content, this metric is also calculated through in some embodiments the birch algorithm. Whereby at each timestamp, if two posts within content fall in the same cluster, this metric increases by the length of the timestamp. Similar the max distance is defined by in some embodiments, a 2D-matrix of size posts within content x posts within content that also describes the similarity between two posts within content. This is the maximum distance between two retags at any point in time within the video whereby the smaller number would mean more similar. Other methods include the system to normalize cluster scores but the duration of the posts within content whereby getting the first four main cluster by sorted by a cluster scores. The system may avoid getting two similar posts within content in the main clusters, the system may in some embodiments adjust the cluster scores according to total time together after each main cluster is selected. The system may check the max distance against existing main clusters. The remaining posts within content whereby may determine the closest main cluster with the total time together (>0.4). If no main cluster with the total time together >0.4, the system may throw away posts within content, otherwise determine whether the posts is close enough to the main cluster to count directly towards it with the max distances (<=0.3). The system may add it to a list of branched children. Additionally in some embodiments for all the branched children, apply the same methods, except on using total time together, and max distance. Whereby in some embodiments are grouped points 810, 811, 812, 813, 814, 815 each move around the user's vantage point and or position relative to the user's current position.

Figure 8C:
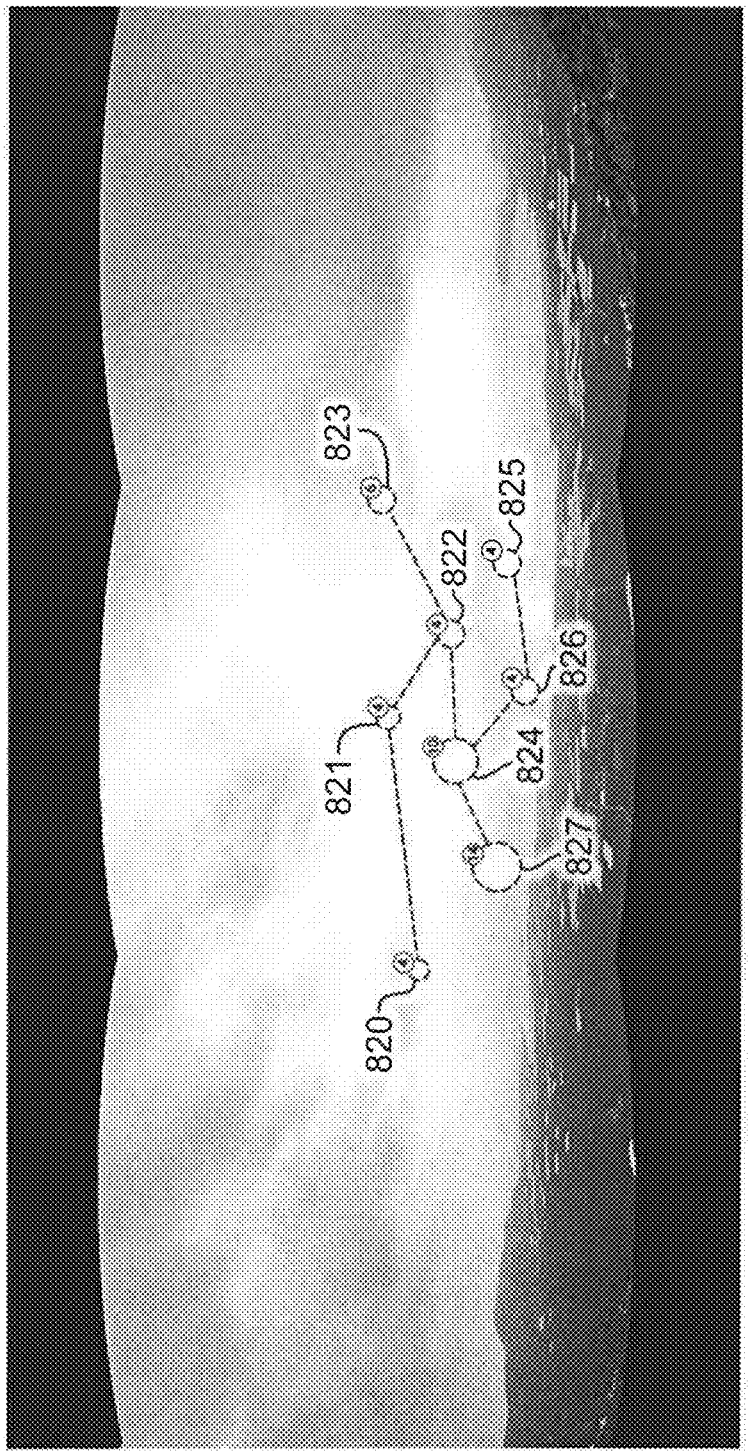

FIG. 8C illustrates media with posts whereby the user device and the system converge or grouped together. For example, grouped points 820, 821, 822, 823, 824, 825, 826, 827 each are made up of points. In the illustrated example, point 820 is along a path or trajectory that moves to 821, 822, 824 and 827. Along the way other grouped points join the same trajectory and the number of grouped points increase, therefore incrementing the count. As illustrated in this example points 820 travels to 821 then 822 where it is met at 822 with points 823 and at point 824 the count has increased from four grouped to ten group. Additionally points 825 travels to 826 and meets the original point at 824, therefore increasing the grouped count to fourteen. As well as points increasing in count by the number of posts they can also decrease when points separate. Grouped clusters do not need to end with the same number of embodied posts as they started with.

Figure 9A:
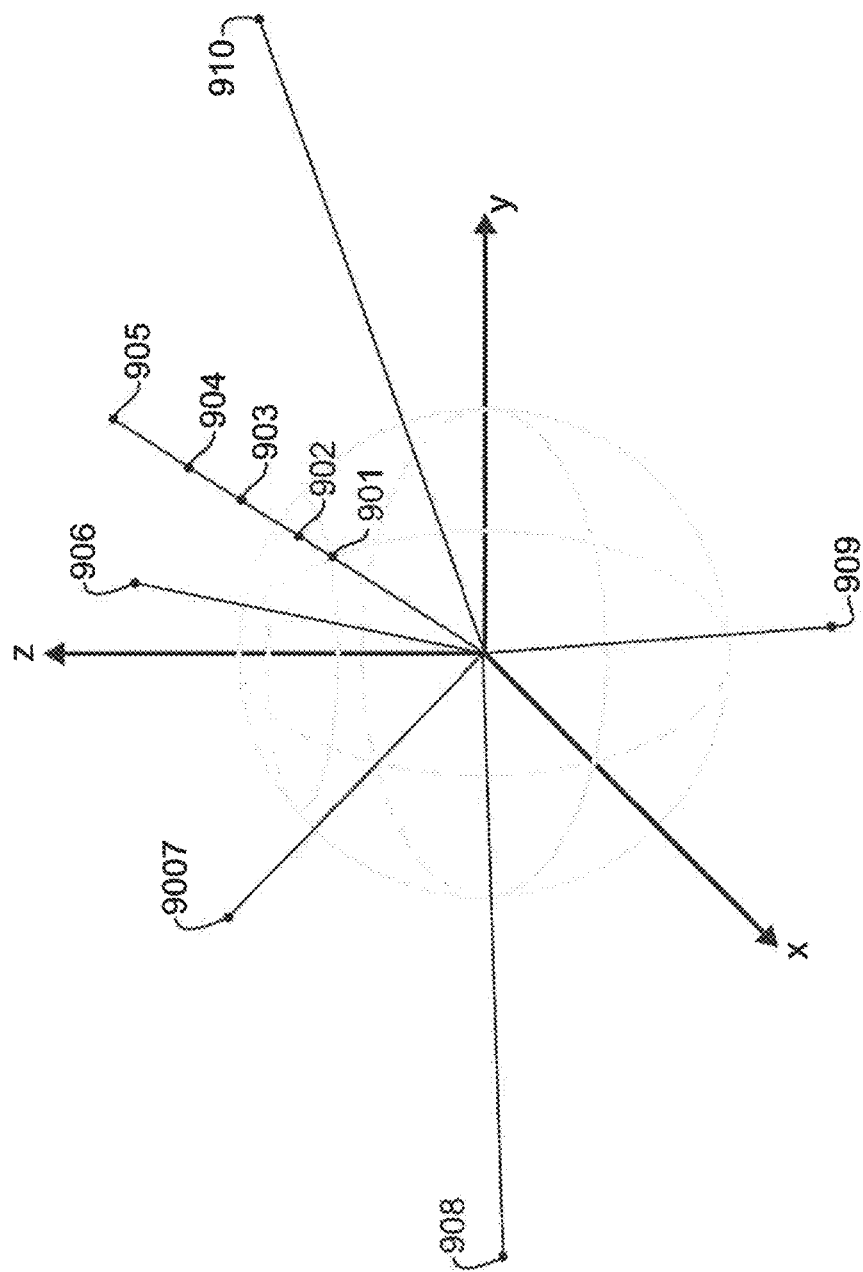
FIG. 9A illustrates a spherical coordinates within digital media or augmented reality from a vantage point and other various points.
Figure 9B:
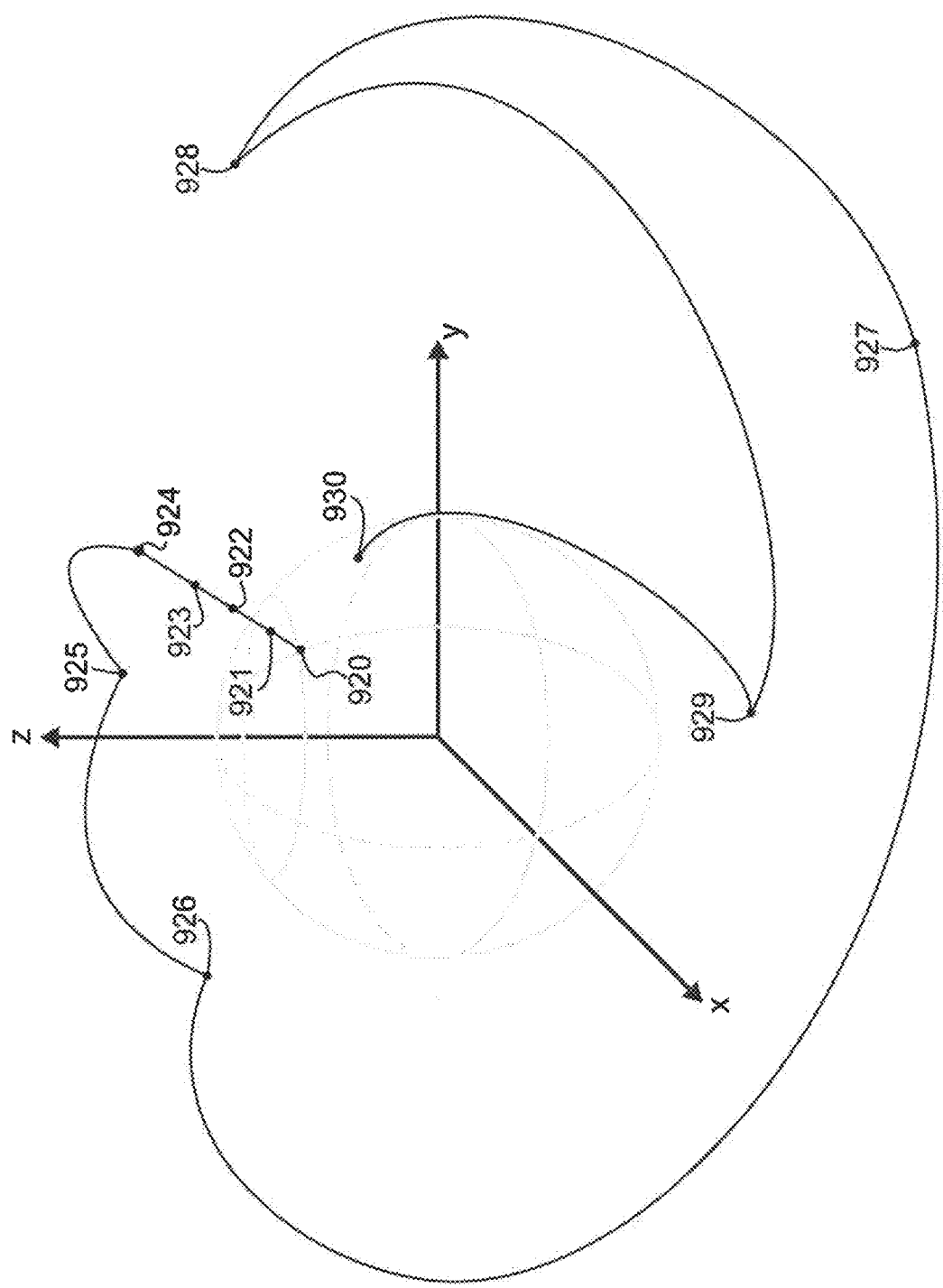
FIG. 9B illustrates a spherical coordinates within digital media or augmented reality from a vantage point view a point change position with change in time.

FIG. 9A illustrates a spherical coordinates within digital media or augmented reality from a vantage point or origin and other various points. In any number of situation ranging from spherical images or video to real-time augment reality FIG. 9A from the same origin describe various points around a single origin (901, 902, 903, 904, 905, 906, 907, 908, 909, 910). The simple example would cluster some points around the same origin or multiple origins where in some embodiments the points 901, 902, 903, 904, 905 would be clustered together showing the number of embedded objects (five points around the origin). FIG. 9B illustrates a spherical coordinates within digital media or augmented reality from a vantage point or origin view a point change position with change in time. In some embodiment, around an item with the single origin that has a starting time and location of 920 and end-time and location 932. As the embedded object moves from point to point (920, 921, 922, 923, 924, 925, 926, 927, 928, 929, 930, 931, and 932). The simplification from point to point could include points from points every half a millisecond to millisecond to half a second or seconds or more.

FIG. 9C illustrates a spherical coordinates from the vantage point and in some embodiments it is not necessary or needed to have a vantage point or a point of origin. For the illustrated example for photos, videos or similar like live broadcasts, points may move or remain stationary. A point 940, 941 942, 943 move to point 944 that separate for a period of time then join back together at 945, while after separating to two different trajectories going to points 946 and 955 and meeting again at 947. At point 947 is made up of one or more posts from the content where points 947-*a* has a trajectory that is different than 947-*b*. After point 947 the trajectories of points separate and join back together at the time at point 948 is made up of one or more posts from the content where points 948-*a* has a trajectory that is different than 948-*b*. Point 948-*a* is part of one or more other posts that moves to point 960. Furthermore point 948-*b* moves to 949 then to 950 to 951 then to 952.

Figure 10A:
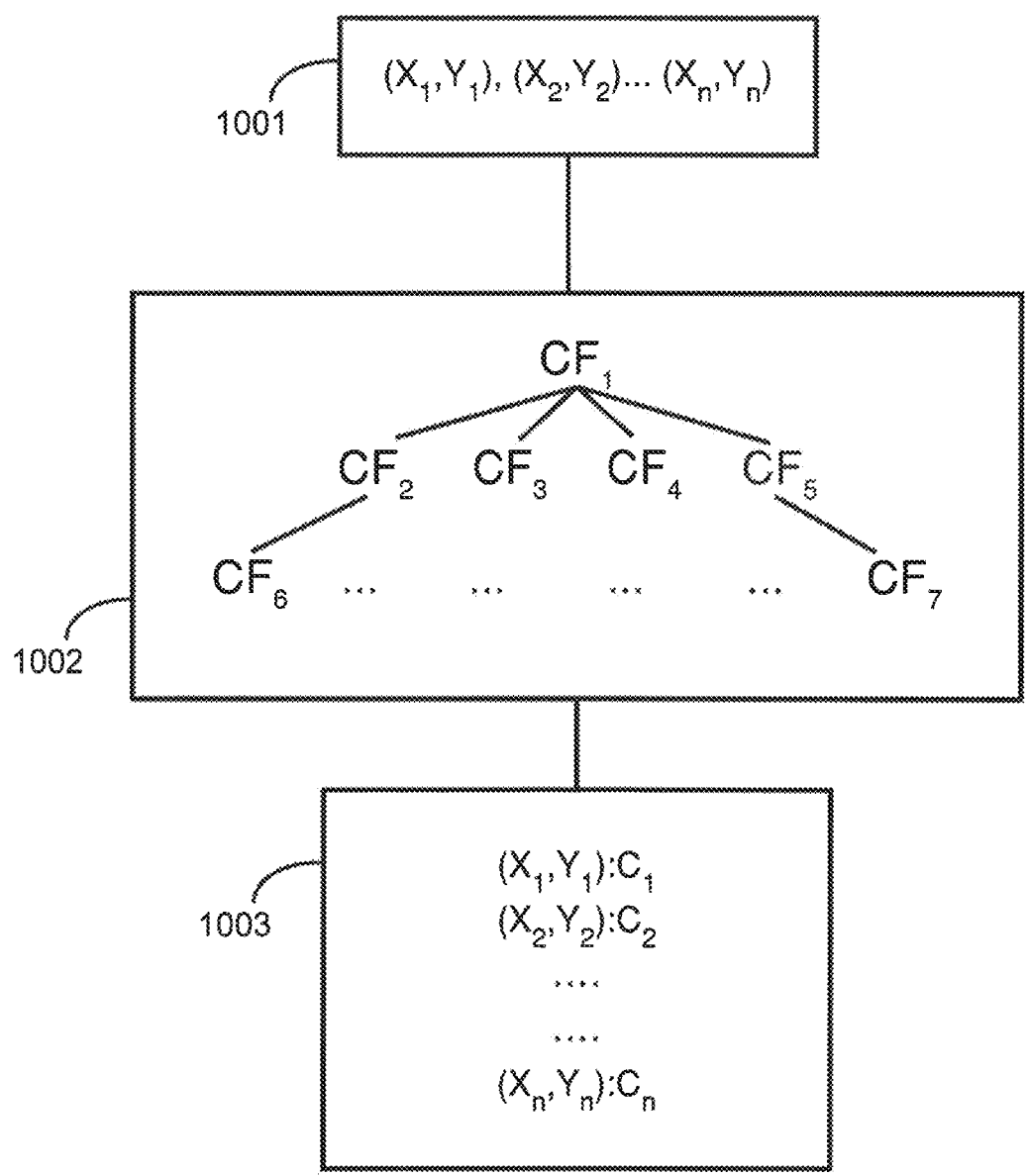
FIG. 10A and FIG. 10B illustrates flow diagrams of where points reach convergence in digital media.
Figure 10B:
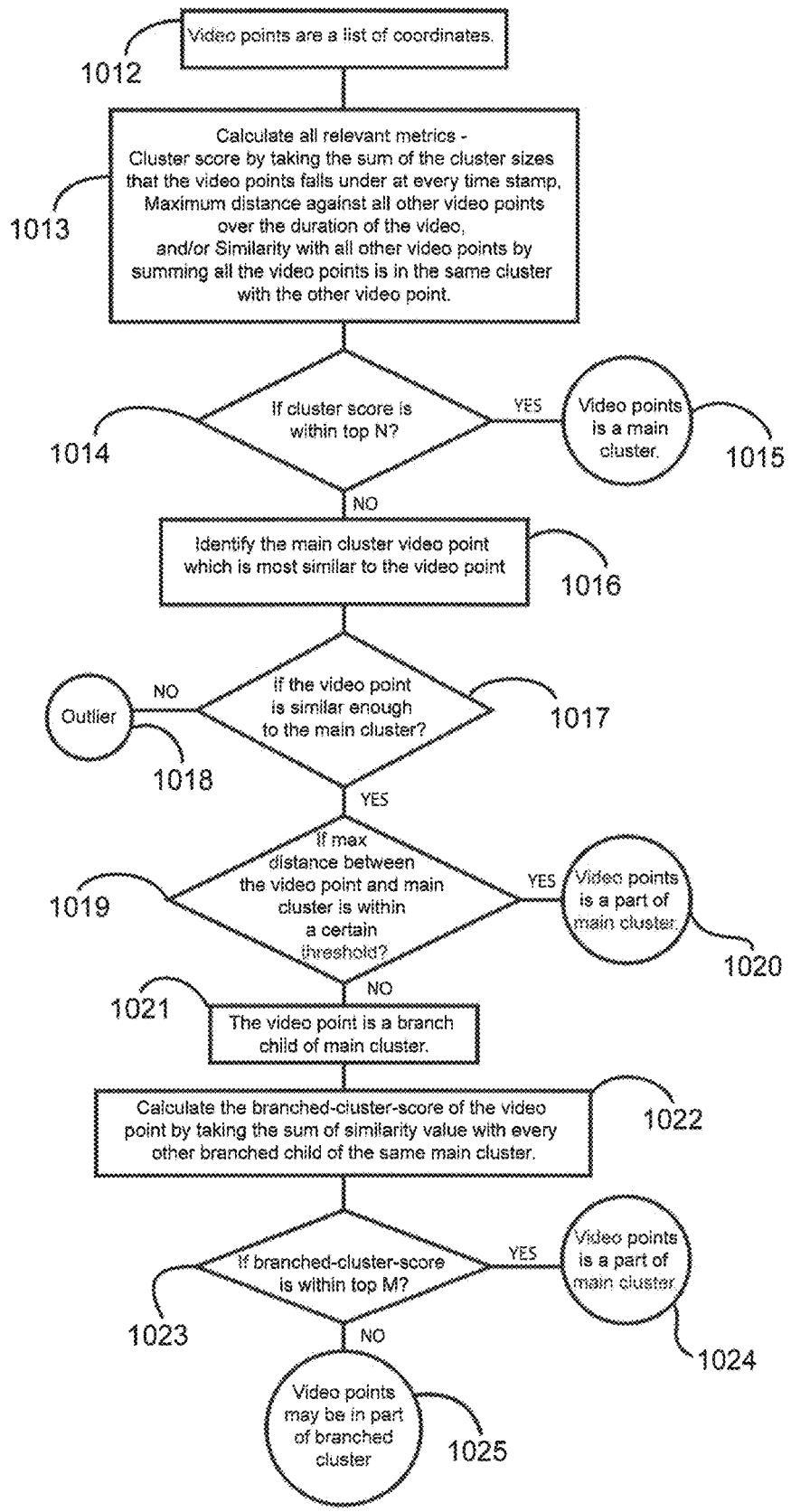

FIG. 10A and FIG. 10B illustrates flow diagrams of where points reach convergence in digital media. In some embodiments the system may implement various algorithms for points to reach convergence. For example to find the centroid of a cluster, the average points of all the points in a cluster and can be described as $$\vec{X}0 = \frac{\sum_{i=1}^{N} \vec{X}_i}{N}.$$

Additionally the radius of a cluster is average distance from the centroid and can be expressed as $$R = \left( \frac{\sum_{i=1}^{N} (\vec{X}_i - \vec{X}0)^2}{N} \right)^{\frac{1}{2}}.$$

Other embodiments the diameter of a cluster is the average pairwise distance of the cluster expressed as $$D = \left( \frac{\sum_{i=1}^{N} \sum_{j=1}^{N} (\vec{X}_i - \vec{X}_j)^2}{N(N-1)} \right)^{\frac{1}{2}}.$$

Other expressions the system may use to assist in clustering include the centroid Euclidian distance $$D0 = \left( (X\vec{O}_1 - X\vec{O}_2)^2 \right)^{\frac{1}{2}},$$

the distance $D1 = |X\vec{0}_1 - X = X\vec{0}_2| = \sum_{i=1}^{d} |X\vec{0}_1^{(i)} - X\vec{0}_2^{(i)}|$, average inter-cluster distance $$D2 = \left( \frac{\sum_{i=1}^{N_1} \sum_{j=N_1+1}^{N_1+N_2} (\vec{X}_i - \vec{X}_j)^2}{N_1 N_2} \right)^{\frac{1}{2}},$$

the average intra-cluster distance $$D3 = \left( \frac{\sum_{i=1}^{N_1+N_2} \sum_{j=1}^{N_1+N_2} (\vec{X}_i - \vec{X}_j)^2}{(N_1 + N_2)(N_1 + N_2 - 1)} \right)^{\frac{1}{2}},$$

and variance increase distance is expressed as $$D4 = \sum_{k=1}^{N_1+N_2} \left( \vec{X}_k - \frac{\sum_{i=1}^{N_1+N_2} \vec{X}_i}{N_1 + N_2} \right)^2 - \sum_{i=1}^{N_1} \left( \vec{X}_i - \frac{\sum_{i=1}^{N_1+N_2} \vec{X}_i}{N_1} \right)^2 - \sum_{j=N_1+1}^{N_1+N_2} \left( \vec{X}_j - \frac{\sum_{i=N_1+1}^{N_1+N_2} \vec{X}_i}{N_2} \right)^2.$$

FIG. 10A illustrates a flow diagrams for image clustering for embedded digital media and posts. A collection of points on the given digital media 1001 and can be expressed as ($x_1$, $y_1$), ($x_2, y_2$) . . . ($x_n$, $y_n$). The system then in some embodiments determines the 1002 Cluster Feature (CF) vector, where it can be used to calculate all the values previously defined in this section. In some embodiments the system may include two CF vectors and add the corresponding values together to get the CF vector of the combined cluster. A CF tree is in some embodiments a B-tree of CF vectors where the root would be the CF vector of all clustered data points. Each non-leaf node in the tree has a CF vector and at most B children. Each leaf node has at most L CF vector entries. Additionally the data points are inserted one by one to an initially empty CF tree. The system may in some embodiments insert a data point, iterate from the root of the CF tree to a leaf node by choosing the closest (using one of D0, D1, D2, D3, or D4) child node at each step. A leaf node where the system in some embodiments would find the closest entry. Then determine whether the entry's cluster will be valid after the new data points are added by comparing the radius or diameter of the new cluster against the threshold value. If the radius or diameter is greater than the threshold, the system may add a new entry to the leaf node. The embodiments may include leaf node now exceeds L entries, the system may split the node. If the parent of the node already include B children, the system may split the parent repeating this process until the root. In some embodiments the data point is inserted into an entry, the system may propagate the change to all the CF vectors from the leaf node to the root. The system may create points 1003 from the original points of 1001 and in some embodiments can be expressed as ($x_1$, $y_1$): $C_1$, ($x_2, y_2$): $C_2$ . . . ($x_n$, $y_n$): $C_n$.

FIG. 10B illustrates a flow diagram for videos. In some embodiment this method is expanded to include a three dimensional component. Video points include a list of coordinates 1012, in some embodiments include coordinates and time tuples. Video points may be expressed as $VP_i = [(x_1, y_1, t_1), (x_2, y_2, t_2) \ldots (x_n, y_n, t_n)]$. Where $VP_i$ is video points. The described system then calculates all relevant metrics 1013. In some embodiments the system may create a cluster score by taking the sum of the cluster sizes that the video point falls under at every time stamp expressed in some embodiments as $$Clusterscore_i = \frac{\sum_{t \in T} |C(i, t)|}{dur_i}.$$

The maximum distance against all other video points over the duration of the video expressed in some embodiments as $$j \in VP\text{Max\_dist}(i, j) = \max_{t \in T}\left(((i_t - j_t)^2)^{\frac{1}{2}}\right).$$

The system may identify the similarity with all other video points by summing all the time stamps that the video point is in the same cluster with the other video point expressed in some embodiments as j∈VP Similarity(i,j)=$\Sigma_{t \in T}C(i,t)$==C (j,t). The system may include other methods and embodiments to converge points with respects to the type of media. From calculating the relevant metrics the system determines if cluster score is within top N 1014. If N is within the top then the video points is a main cluster 1015. If the cluster score is not in the top N then the system identifies the main cluster video point which is most similar to the video point 1016. In some embodiments the most similar to the video point can be expressed as $$\text{best\_mc} = \text{ArgMax}_{mc \in MC} \frac{Sim(i, mc)}{t_n - t_1}.$$

If 1017 the video point is similar enough to the main cluster found from 1016. In some embodiments to describe a similar enough point can be expressed as $$\frac{Sim(i, \text{best\_mc})}{t_n - t_1} \geq 0.4.$$

If video points are not similar enough in some embodiments described as an outlier 1018 and in some embodiments is defined as a value that is much smaller, larger than or different than most of the other values in a set of data. The system can handle outliers in various ways and methods that may continue from this position. If the max distance 1019 between the video point and main cluster from 1016 is within a certain threshold can be described and/or expressed as in some embodiments as max_dist(i, best_mc)≤0.3. Some points are video points that are part of main cluster 1020. If video points are not part of the main cluster then in some embodiments the video point is a branch child of the main cluster 1021. Continuing the system may calculate the branched-cluster-score or branched clusterscore$_i$ of the video point by taking the sum of similarity value with every other branched child of the same main cluster 1022. In some embodiments the sum of similarity value can be expressed as $$\text{branched } clusterscore_i = \sum_{bc \in BC_{best\_mc}} Sim(i, bc).$$

If branched-cluster-score is within top M 1023, then video points is part of the main cluster 1024. If branched-cluster-score is not within top M 1023, then video points may be in part of branched cluster. As in a general context the system may include methods to converge points whereby include the possibility of trending retag points with or without a timing component. In some embodiments the system may use and not use methods of object detection combined with retag clustering to precisely find what users interests are. Additional embodiments include popular text of each cluster and or hashtag. Other embodiments may include an outlier detection where in some embodiments makes it possible to ignore as noise or irregular data. The system in some embodiments may include and consider diversity of user information to include location, age and gender.

Additionally the system may include intervals where clusters for vast 3d or augments space or videos that are long in length may include other data like counts of clusters or time or a summary of points. Additional implantation include tracing an object from points identified by users or the system from embedded posts. In other embodiments include methods where the system can calculate cluster score and other metrics, define the main clusters, then add points to clusters and define branched clusters. At every frame, the system may determine the approximate position of every video point and run algorithms on these points. In some embodiments for every point, cluster score per video frame is calculated by taking the size of the cluster that the point falls under; then add this score to the overall cluster score of the video point. The system may also compare or pair the distance between every pair of points and update the Max Distances matrix. Additionally for every pair of points within each cluster, increments the similarity entry. After all frames have been clustered, the system may normalize the cluster scores by square root of the duration of the video point. Then the system selects a candidate cluster point by taking the video point with the highest cluster score and if this point doesn't stray far from any of the existing clusters points (if max distance between candidate and cluster is less than a chosen threshold), adds this point to the existing cluster. Otherwise the system may add this point to the list of clusters. For every remaining video points, find the closest cluster by taking the cluster with maximum similarity value between the cluster and the point. If the similarity value does not exceed 40% (this threshold value or similarity value may be changed) of the video point's duration, this video point is considered to be an outlier. If the similarity value exceeds the threshold, the max distance between the cluster and the video point is checked against another threshold. If the max distance is within the threshold, the video point is added to the cluster. If not, the video point is considered to be a branched child of the cluster. The system in some embodiments for every cluster, we look at all the branched children of the cluster. Calculate the branched cluster score of every branched child in the cluster by summing the similarity values between the child and every other branched child in the cluster. The system can then choose a new cluster point by taking the unclustered branched child with the highest branched cluster score. Create a new cluster out of the selected point. In some embodiments, and the system may add other unclustered branched children to the cluster if the max distance is within a certain threshold. Equations, thresholds, similarity values, or values are not meant to limit or bound the scope of the enclosed invention.

A user in some applications, digital media or augmented reality can define a region within a video. With or without an interactive experience to embed points within another media object. In some embodiment the user interface may import the amount of time to embed another object and may have a minimum time. In some embodiments digital media 3D, 360 degree or augmented reality and not coupled where a user can define a region within a video.

In some embodiments digital media that may not be in the form of 3D, 360 degree or augmented reality. Where some embodiments the user can perform a similar action but the user can continuously make points in a full circle, full sphere or 180 degrees or other degrees. In some embodiments the arrows can be operated by touch, a mouse, by the user looking in the opposite direction or another direction. The process of embedding objects may reflect associations with just a timing component.

Some embodiments include spatial, temporal and shape paths and grouping of objects whereby also including capacity, crowding and speed. Object in a spatial environment may include more features of converged points that are visited more frequently whereby the makeup would be posts and other advertisements. Grouped points may be joined, grouped to points similar in content not in the path of the objects. Other things may include updating converged points. The methods can use various implications of the k-means and k-means++. In some embodiments the analysis introduces complexity and convergence to consistently track and group one or more groups into main groups or sub groups. The system may in some embodiments the system may use octree.

The translation from 2d to 3d, that include run time or not and includes distance. The user device incorporates distance and in some embodiments can be set by pressure on a stylist or a users finger to the screen. Also a user may be actually moving and referenced in a virtual environment. The system can automatically return clusters of embedded data that shows nearby data that is also embedded. The said embedded data could be used alongside with artificial intelligent to generate expected number of posts within each region of the associate image, video or digital media. Data can be derived from posts, digital media or files shared with the system whereby the system can identify one or more objects or data within any posts, digital media or file that are shared to the system through the system (or remote system) and/or not shared to the system through the system (or remote system). For example an object within an image may have a barcode, where any part of the barcode may be used to identify the object to use when providing information to one or more users and/or to relate one or more users, objects, posts, and/or digital media within the system.

What is claimed:

1. A computer implemented method of managing posts for interacting with digital media items, digital media items comprising video, 3d video, 360-degree video, geocoded video or spherical digital video, the method comprising:
   providing a user application operating on one or more user devices which are operative to view digital media items, the user application for creating posts that are associated with points that remain fixed or change position per frame in select ones of digital media items;
   providing a database system for storing user created posts;
   creating and managing embedded data in user created posts and one or more select locations in said select digital media items, wherein said embedded data is clustered to create a plurality of grouped posts each comprising user created posts that follow similar paths in the select ones of the digital media items and the user application displays the digital media items with indicia illustrating the grouped posts, wherein the indicia moves with the points that change position per frame in the select ones of the digital media items; and
   wherein users interacting with the user application can access grouped posts.

2. The computer implemented method of claim 1, wherein video digital media items comprise a sequence of frames and the one or more select locations comprise select ones of the sequence of frames.

3. The computer implemented method of claim 1, wherein methods for users interacting with the user application include augmented reality, live/real-time video broadcast and virtual reality.

4. The computer implemented method of claim 1, wherein video digital media items comprise a sequence of frames and the one or more select locations comprises a select coordinate position on one or more frames of the sequence of frames.

5. The computer implemented method of claim 4, wherein the select coordinate position changes during the sequence of frames.

6. The computer implemented method of claim 1, wherein the database system stores a plurality of data items each having associated digital data relating to one or more of user basic information, user favorites, user profile, user relationship, user interest, user preferences, or user social connection.

7. The computer implemented method of claim 1, wherein providing a user application further comprises creating posts that refer to previously created posts to digital media items.

8. The computer implemented method of claim 1, wherein users can share posts, and posts that refer to and/or are embedded within another post, with no additional digital media, links, or text.

9. The computer implemented method of claim 1, wherein the user application is used with a user device for accessing one or more posts and/or posts that refer to and/or are embedded within another post.

10. The computer implemented method of claim 9 wherein posts that refer to and/or are embedded within any part of another post contain referencing data.

11. The computer implemented method of claim 1, wherein posts comprise one or more documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

12. The computer implemented method of claim 1, wherein embedded data may be clustered at any sequence with respect to changes in time or location.

13. The computer implemented method of claim 12, wherein clustering at any sequence incorporates or results to one or a combination of type of media content, advertisements, documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

14. The computer implemented method of claim 1, wherein embedded data being clustered comprises assisting tracking of objects, assisting to identification of closest objects, most popular, trending or socially relevant media.

15. A system of managing posts for interacting with web based digital media, comprising:
   a user interface application operating on one or more user devices which are operative to view digital video, the user interface application creating posts that are associated with points that remain fixed or change position per frame in digital media items, digital media items comprising, video, 3d video, 360-degree video, geocoded video or spherical digital video;
   a database system for storing user created posts; and a programmed processing system in operative communication with user devices and the database system for creating and managing embedded data used in user created posts and one or more select locations in said select digital media items, wherein said embedded data is clustered to create a plurality of grouped posts each comprising user created posts that follow similar paths in the select ones of the digital media items and the user application displays the digital media items with indicia illustrating the grouped posts, wherein the indicia moves with the points, that change position per frame in the select ones of the digital media items; and wherein users interacting with the user interface application can access grouped posts.

16. The system of claim 15, wherein video digital media items comprise a sequence of frames and the one or more select locations comprise select ones of the sequence of frames.

17. The system of claim 15, wherein video digital media items comprise a sequence of frames and the one or more select locations comprises a select coordinate position on one or more frames of the sequence of frames.

18. The system of claim 17, wherein the select coordinate position changes during the sequence of frames.

19. The system of claim 15, wherein methods for interactions include augmented reality, live/real-time video broadcast and virtual reality.

20. The system of claim 15, wherein the database system stores a plurality of data items each having associated digital data relating to one or more of user basic information, user favorites, user profile, user relationship, user interest, user preferences, or user social connection.

21. The system of claim 15, wherein the user interface application further comprises creating posts that refer to previously created posts that refer to digital media items.

22. The system of claim 15, wherein users can share posts, and posts that refer to and/or are embedded within another post, with no additional digital media, links, or text.

23. The system of claim 15, wherein the user interface application is used with a user device for accessing one or more posts and/or posts that refer to and/or are embedded within another post.

24. The system of claim 15, wherein posts comprise one or more documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

25. The system of claim 23 wherein posts that refer to and/or are embedded within any part of another post contain referencing data.

26. The system of claim 15 wherein the user interface application enables user searches which selectively return results that include one or more sequences of frames of a select digital media item.

27. The system of claim 15, wherein a temporary post is created with a sequence of frames comprising of one or more advertisements, documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

28. The system of claim 15, wherein embedded data may be clustered at any sequence with respect to changes in time or location.

29. The system of claim 28, wherein clustering at any sequence incorporates or results to one or a combination of type of media content, advertisements, documents, digital images, digital video, sounds, digital albums, graphics, augmented representation, links, events, articles, apps, text while also containing one, a plurality and/or combination of data, metadata, metatags, EXIF data, keyword tags, hashtags, comments, favorites, text, links, location, entities, objects, entries, places, and users.

30. The system of claim 15, wherein embedded data being clustered or grouped to reach convergence, comprises assisting tracking of objects, assisting to identification of closest objects, most popular, trending or socially relevant media.

* * * * *